United States Patent
McLaughlin et al.

(10) Patent No.: US 11,807,587 B2
(45) Date of Patent: *Nov. 7, 2023

(54) ACID TREATMENT FOR FERTILIZERS TO INCREASE ZINC SOLUBILITY AND AVAILABILITY

(71) Applicant: The Mosaic Company, Plymouth, MN (US)

(72) Inventors: Michael John McLaughlin, Montacute (AU); Jozefien Louisa Elvire Degryse, Parkside (AU); Roslyn Jane Baird, Aberfoyle Park (AU); Rodrigo Coqui da Silva, Redwood Park (AU); Bryan Todd Baylor, Lithia, FL (US); Lawrence Alan Peacock, Riverview, FL (US)

(73) Assignee: The Mosaic Company, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,165

(22) Filed: Nov. 5, 2019

(65) Prior Publication Data

US 2020/0062667 A1 Feb. 27, 2020

Related U.S. Application Data

(62) Division of application No. 15/235,499, filed on Aug. 12, 2016, now Pat. No. 10,487,016.

(Continued)

(51) Int. Cl.
*C05G 5/30* (2020.01)
*C05B 17/00* (2006.01)
(Continued)

(52) U.S. Cl.
CPC ............... *C05G 5/36* (2020.02); *C05B 7/00* (2013.01); *C05B 17/00* (2013.01); *C05B 19/00* (2013.01);
(Continued)

(58) Field of Classification Search
None
See application file for complete search history.

(56) References Cited

U.S. PATENT DOCUMENTS

| | | |
|---|---|---|
| 2,739,886 A | 3/1956 | Henry et al. |
| 3,304,249 A | 2/1967 | Herbert et al. |

(Continued)

FOREIGN PATENT DOCUMENTS

| | | |
|---|---|---|
| AU | 554749 B1 | 9/1986 |
| AU | 754223 B2 | 11/2002 |

(Continued)

OTHER PUBLICATIONS

Application and File history for U.S. Appl. No. 14/913,091, filed Feb. 19, 2016. Inventors: Jacobson et al.

(Continued)

*Primary Examiner* — Wayne A Langel
(74) *Attorney, Agent, or Firm* — Patterson Thuente, P.A.

(57) ABSTRACT

Methods and system for increasing the water solubility and availability of zinc in granular fertilizers using acid treatments. The treatment of granular fertilizers with an acidic solution increases an amount of water-soluble zinc, which in turn, increases the efficiency of zinc uptake and reduces the costs and equipment otherwise needed to mitigate zinc deficiencies.

27 Claims, 13 Drawing Sheets

Related U.S. Application Data

(60) Provisional application No. 62/204,195, filed on Aug. 12, 2015.

(51) Int. Cl.
    | | |
    |---|---|
    | *C05B 19/00* | (2006.01) |
    | *C05D 9/02* | (2006.01) |
    | *C05C 9/00* | (2006.01) |
    | *C05D 9/00* | (2006.01) |
    | *C05C 1/00* | (2006.01) |
    | *C05B 7/00* | (2006.01) |
    | *C05D 1/02* | (2006.01) |
    | *C05G 3/40* | (2020.01) |
    | *C05G 5/12* | (2020.01) |
    | *B01J 2/12* | (2006.01) |
    | *B01J 2/00* | (2006.01) |

(52) U.S. Cl.
    CPC ............... *C05C 1/00* (2013.01); *C05C 9/005* (2013.01); *C05D 1/02* (2013.01); *C05D 9/00* (2013.01); *C05D 9/02* (2013.01); *C05G 3/44* (2020.02); *B01J 2/003* (2013.01); *B01J 2/12* (2013.01)

(56) References Cited

U.S. PATENT DOCUMENTS

| | | |
|---|---|---|
| 3,520,651 A | 7/1970 | Philen, Jr. et al. |
| 3,523,019 A | 8/1970 | Philen, Jr. et al. |
| 3,560,192 A | 2/1971 | Cicco et al. |
| 3,708,275 A | 1/1973 | Camp, Jr. |
| 3,734,707 A | 5/1973 | Seymour |
| 3,854,923 A | 12/1974 | Ott |
| 3,885,946 A | 5/1975 | Seymour |
| 3,953,192 A | 4/1976 | Hodgson et al. |
| 4,319,910 A | 3/1982 | Meyer |
| 4,507,142 A | 3/1985 | Pace et al. |
| 4,581,056 A | 4/1986 | Nooden et al. |
| 4,581,057 A | 4/1986 | Nooden |
| 4,846,409 A * | 7/1989 | Kaspar ............ B01J 2/00 241/21 |
| 5,044,093 A * | 9/1991 | Itoh ............... B01J 2/16 34/585 |
| 5,328,497 A | 7/1994 | Hazlett |
| 5,360,465 A | 11/1994 | Buchholz et al. |
| 5,366,532 A | 11/1994 | Fages et al. |
| 5,383,952 A | 1/1995 | Singewald et al. |
| 5,431,708 A | 7/1995 | Lehmann et al. |
| 5,433,766 A | 7/1995 | Ming et al. |
| 5,451,242 A | 9/1995 | Ming et al. |
| 5,849,060 A | 12/1998 | Diping et al. |
| 5,851,260 A | 12/1998 | Aijala et al. |
| 5,968,222 A | 10/1999 | Kodali |
| 6,107,269 A * | 8/2000 | Engels ............ B01J 2/00 264/117 |
| 6,311,426 B1 | 11/2001 | Mehta et al. |
| 6,322,607 B1 | 11/2001 | Brown et al. |
| 6,331,300 B1 | 12/2001 | Dybas et al. |
| 6,346,131 B1 | 2/2002 | Bergevin |
| 6,491,736 B1 | 12/2002 | Bell et al. |
| 6,544,313 B2 | 4/2003 | Peacock et al. |
| 6,797,277 B2 | 9/2004 | Heier et al. |
| 7,297,314 B2 | 11/2007 | Natsuyama et al. |
| 7,410,522 B2 | 8/2008 | Green |
| 7,445,657 B2 | 11/2008 | Green |
| 7,497,891 B2 | 3/2009 | Peacock |
| 7,691,169 B2 | 4/2010 | McCoy, Jr. |
| 8,110,017 B2 | 2/2012 | Wells |
| 8,221,515 B2 | 7/2012 | Goodwin |
| 8,497,229 B2 | 7/2013 | Van Boxtel-Verhoeven et al. |
| 8,506,670 B2 | 8/2013 | Varadachari |
| 8,557,013 B2 | 10/2013 | Burnham et al. |
| 9,199,883 B2 | 12/2015 | Peacock et al. |
| 10,487,016 B2 * | 11/2019 | McLaughlin ........ C05B 17/00 |
| 10,654,759 B2 | 5/2020 | Jacobson et al. |
| 2002/0098982 A1 | 7/2002 | Burnham |
| 2005/0020449 A1 | 1/2005 | Blais |
| 2006/0081028 A1 | 4/2006 | Hammons |
| 2007/0131009 A1 | 6/2007 | Westbrook et al. |
| 2010/0170314 A1 | 7/2010 | Goodwin |
| 2011/0000268 A1 | 1/2011 | Schaafsma et al. |
| 2011/0077155 A1 | 3/2011 | Goodwin |
| 2011/0154873 A1 | 6/2011 | Burnham et al. |
| 2011/0154874 A1 | 6/2011 | Rahn et al. |
| 2011/0214465 A1 | 9/2011 | Peacock et al. |
| 2012/0073341 A1 | 3/2012 | Goodwin |
| 2012/0090367 A1 | 4/2012 | Wright et al. |
| 2013/0305796 A1 | 11/2013 | Hudson et al. |
| 2014/0352376 A1 | 12/2014 | Carpenter |
| 2015/0141244 A1 | 5/2015 | Hellwege et al. |
| 2015/0141245 A1 | 5/2015 | Wachendorff-Neumann et al. |
| 2015/0141246 A1 | 5/2015 | Hellwege et al. |
| 2015/0148228 A1 | 5/2015 | Wachendorff-Neumann et al. |
| 2015/0210603 A1 | 7/2015 | Du et al. |
| 2015/0251962 A1 | 9/2015 | Peacock et al. |
| 2015/0376076 A1 | 12/2015 | Ward et al. |
| 2016/0083308 A1 | 3/2016 | Peacock et al. |
| 2016/0159706 A1 * | 6/2016 | McCoy, Jr. ........ C05D 9/00 71/23 |
| 2016/0200637 A1 | 7/2016 | Jacobson et al. |
| 2017/0044078 A1 | 2/2017 | McLaughlin et al. |
| 2017/0057881 A1 | 3/2017 | Goodwin et al. |
| 2017/0066693 A1 | 3/2017 | Ledoux |
| 2017/0197890 A1 | 7/2017 | Jacobson et al. |
| 2020/0277239 A1 | 9/2020 | Jacobson et al. |

FOREIGN PATENT DOCUMENTS

| | | |
|---|---|---|
| CN | 101037365 A | 9/2007 |
| CN | 101885635 A | 11/2010 |
| CN | 102652111 A | 8/2012 |
| CN | 102781880 A | 11/2012 |
| CN | 102811979 A | 12/2012 |
| CN | 101993285 B | 6/2013 |
| DE | 136956 A1 | 8/1979 |
| DE | 136956 A1 | 8/1979 |
| EP | 0470287 A1 | 2/1992 |
| GB | 2023109 A | 12/1979 |
| JP | S49105800 A | 10/1974 |
| JP | S61125631 A | 6/1986 |
| JP | S63112484 A | 5/1988 |
| JP | H02275792 A | 11/1990 |
| JP | H07109192 A | 4/1995 |
| JP | H11209190 A | 8/1999 |
| JP | 2000044376 A | 2/2000 |
| JP | 2000143378 A | 5/2000 |
| JP | 2003192483 A | 7/2003 |
| KR | 19990034842 A | 5/1999 |
| KR | 19990046371 A | 7/1999 |
| KR | 20020060680 A | 7/2002 |
| KR | 100399401 B1 | 9/2003 |
| RU | 2125549-01 | 1/1999 |
| UA | 73120 C2 | 4/2002 |
| WO | WO-9506623 A1 | 3/1995 |
| WO | WO-9508521 A1 | 3/1995 |
| WO | WO-9915480 A1 | 4/1999 |
| WO | WO-0064837 A1 | 11/2000 |
| WO | WO-2008000492 A2 | 1/2008 |
| WO | WO-2011073017 A1 | 6/2011 |
| WO | WO-2011080764 A1 | 7/2011 |
| WO | WO-2011082301 A2 | 7/2011 |
| WO | WO-2011109202 A2 | 9/2011 |
| WO | WO-2014036572 A2 | 3/2014 |
| WO | WO-2014193946 A1 | 12/2014 |
| WO | WO-2015026806 A1 | 2/2015 |

OTHER PUBLICATIONS

Application and File history for U.S. Appl. No. 15/235,499, filed Aug. 12, 2016, Inventors: McLaughlin et al., 227 pages.

(56) References Cited

OTHER PUBLICATIONS

Application and File history for U.S. Appl. No. 16/878,212, filed May 19, 2020,. Inventors: Jacobson et al.
Anna N., "Potash Processing: Pelletizing vs. Compaction Granulation," FEECO International, Retrieved from the Internet: http://feeco.com:80/2014/01/02/potash-processing-pelletizing-compaction-granulation/ on Jan. 2, 2014, 4 pages.
"Database WPI," Week 201127, Thomson Scientific, London, GB, AN 2010-Q3017, 11 pages.
IKA designed to work perfectly, "Emulsifying", Retrieved from the Internet: URL: https://www.ikaprocess.com/en/Emulsifying-appl-7.html; on Nov. 22, 2019, pp. 1-2.
International Preliminary Report on Patentability for PCT Application No. PCT/US2016/046717 dated Feb. 22, 2018, 13 pages.
International Search Report and Written Opinion for PCT Application No. PCT/US2016/046717, dated Nov. 21, 2016, 17 pages.
Ivell D.M., et al., "The Evolution of Screening Systems for Optimum Granular Fertilizer Product Quality," Procedia Engineering 83, Jan. 1, 2014, pp. 328-335.
Office Action dated Mar. 13, 2019 for Morocco Application No. PV/42163, 5 pages.
Office Action for Moroccan Application No. 42163, dated Jul. 4, 2018, 6 pages.
Office Action for Pakistan Application No. 497/2016, dated Sep. 26, 2018, 2 pages.
Vashistha M., et al., "Improvement in properties of urea by phosphogypsum coating," International Journal of ChemTech Research, Jan. 1, 2010, 10 pages.
Examination Report dated Mar. 27, 2020 for Australian Application No. 2016305022, 4 pages.
Office Action dated Feb. 3, 2020 for Brazilian Application No. BR112018002845-2, 4 pages.
Office Action dated Mar. 9, 2020 for India Application No. 201817005218, 7 pages.
Office Action dated Jul. 3, 2020 for Chinese Application No. 201680059511.8, 15 pages.
Office Action dated Jan. 19, 2021 for Chinese Application No. 201680059511.8, 6 pages.
Application and File history for U.S. Appl. No. 15/324,473, filed Jan. 6, 2017. Inventors: Jacobson et al.
Application and File history for U.S. Appl. No. 16/674,165, filed Nov. 5, 2019. Inventors: Mclaughlin et al.

* cited by examiner

ACID TREATMENT FOR FERTILIZERS TO INCREASE ZINC SOLUBILITY AND AVAILABILITY

RELATED APPLICATIONS

This application is a continuation of application Ser. No. 15/235,499 filed Aug. 12, 2016, which claims the benefit of U.S. Provisional Application No. 62/204,195 filed Aug. 12, 2015, each of which is hereby incorporated herein in its entirety by reference.

FIELD OF THE INVENTION

Embodiments of the present invention are directed generally to acid treatment of fertilizers. Specifically, embodiments of the present invention are directed to the materials and methods for increasing water solubility and availability of zinc using acid treatments.

BACKGROUND OF THE INVENTION

Nutrient availability is one of the main factors affecting plant growth and development. Nutrient management, including the application of fertilizers, is crucial for optimal productivity in commercial crop production. Many nutrients, including both mineral and non-mineral elements, are essential for a plant's growth and survival. The non-mineral elements can include, for example, hydrogen, oxygen, and carbon, typically available from the surrounding air and water. The mineral nutrients, including nitrogen (N), phosphorous (P), and potassium (K) are available or made available in the soil for uptake by the plant's roots.

The mineral nutrients can generally be divided into two groups: macronutrients, including primary nutrients and secondary nutrients, and micronutrients. The primary mineral nutrients include N, P, and K. Large amounts of these nutrients are essential to a plant's survival, and therefore typically make up the majority of a fertilizer composition. In addition to primary nutrients, secondary nutrients are required in much smaller amounts than those of the primary nutrients. Secondary nutrients include, for example, calcium (Ca), sulfur (S), and magnesium (Mg).

Micronutrients can include, for example, boron (B), copper (Cu), iron (Fe), manganese (Mn), molybdenum (Mo), zinc (Zn), chlorine (Cl), cobalt (Co), sodium (Na), and combinations thereof. Despite being present in trace quantities, generally in concentrations less than 100 parts per million (ppm) in plant tissues, micronutrients are essential for carrying out a wide range of physiological functions, including photosynthesis, chlorosis, metabolic regulation, and osmotic regulation. However, micronutrient deficiencies are common in soils throughout the world, partly due to the fact that many micronutrients are easily adsorbed or precipitated in soil, which compromises their solubility and availability. The steady growth of crop yields during recent decades has compounded the problem by progressively depleting soil micronutrient pools.

Zinc deficiency appears to be a frequent micronutrient deficiency problem in crops worldwide, particularly in countries where soils are low in plant available Zn. It is especially common in soils with high pH (i.e., alkaline soils) and low in organic matter. Soil acidity influences the availability of Zn more than any other factor, with lower Zn solubility as soil pH increases. The availability of Zn may also be reduced by water logging and where root growth is restricted. Cool wet weather, low light intensity, and/or high soil nitrogen, phosphorus, or copper may intensify Zn deficiency.

To address Zn deficiencies, efforts in the agricultural community have been directed at applying Zn exogenously to soil or to fertilizers. Applying Zn directly to the soil is inefficient because Zn, like other micronutrients, is generally present as positively charged metal ions and will readily be strongly sorbed to soil minerals and organic matter, and/or react with negatively charged phosphate ($H_2PO_4^{2-}$ and $HPO_4^-$), carbonate ($CO_3^{2-}$) and/or hydroxide ions ($OH^-$), ultimately forming new compounds that are not available to plants. All these ions are abundant in soil and soilless growth media.

Efforts at applying Zn and other micronutrients to fertilizers have been more promising. For example, in Australian Patent No. AU 554,749, Zn deficiency was addressed by developing a process for adhering Zn to a phosphate-containing fertilizer by treatment with mineral acid in order to bind the Zn compound to the external surfaces of the fertilizer. Other efforts have been directed at increasing the acidity of the soil surrounding a plant or seed in order to promote Zn uptake. For example, U.S. Pat. No. 8,221,515 refers to the application of a powdered micronutrient in addition to a powdered acidifying agent to an agronomic carrier (i.e., a seed or fertilizer granule) to increase soil acidity and promote Zn uptake.

Incorporating micronutrients like Zn into fertilizers (e.g., through chelation or by forming complexes with macronutrients) can offer protection from adsorption or precipitation, especially in neutral and alkaline soils, thus increasing the availability of the micronutrient. Therefore, there remains a need for methods and compositions that can increase the solubility and availability of Zn already present in fertilizer complexes and formulations.

SUMMARY OF THE INVENTION

Embodiments of the present invention are directed generally to acid treatment of fertilizers. Specifically, embodiments of the present invention are directed to the materials and methods for increasing the water solubility and availability of Zn using acid treatments. The acid treatments act to lower the pH of the fertilizer granules and/or to complex or chelate the Zn, therefore increasing the Zn solubility and availability.

In one embodiment, the method includes treating a plurality of fertilizer granules with an acidic solution, such as by spraying, having a surface temperature of about 50° F. to about 250° F., and more particularly about 130° F. to about 200° F., and a crude moisture content of about 0 to about 6.5 weight percent (wt %), more particularly from about 0.5 wt % to about 3 wt % and more particularly from about 0.5 wt % to about 1.5 wt %. The acidic solution can comprise water or a water-based solution including an acidifying and/or complexing or chelating agent, the solution being in the form of liquid, steam, and/or superheated steam. The acidic solution is introduced at a temperature of about 32° F. to about 800° F., depending on the form and composition of the solution, and more particularly from about 70° F. to about 170° F. when the solution is in liquid form.

The granules with acidic solution applied are then optionally subjected to a mechanical energy exposure, such as in the form of tumbling or mixing to induce the desired particle interactions between particles. In an alternative embodiment, the granules and the acidic solution are introduced into a fluidized bed reactor such that the surface of each individual granule is subjected to acid treatment described above, without necessarily being subjected to particle-to-particle interaction or mechanical energy exposure.

In embodiments, the acidic solution can further optionally contain one or more beneficial agricultural, biological, and/or dedusting additives such as those detailed in PCT Application No. PCT/US2015/039302, and PCT Publication Nos. WO2015/026806 A1 and WO2011/109202 A1, all of which are incorporated by reference in their entireties. For example, the acidic solution, in addition to the acidifying and/or complexing agent, can contain biostimulants, corn starch, wheat starch, polyethylenimine (PEI), or combinations thereof, in an amount of about 0.01 wt % to about 99.99 wt %, and more particularly from about 20 wt % to about 50 wt %.

Alternatively, one or more beneficial agricultural, biological, and/or dedusting additives can be introduced onto the surface of the granules separate from the acidic solution (with or without additives), such as by the methods detailed in PCT Application No. PCT/US2015/039302 and PCT Publication No. WO2015/026806 A1. The one or more additives can be added simultaneously or in series with the acidic solution.

In an alternative embodiment of the invention, in addition to or as an alternative to the additives listed above, the acidic solution can also be one or any combination of primary or secondary macronutrients and/or micronutrients in an amount of about 0.01 wt % to about 99.99 wt %, and more particularly from about 20 wt % to about 50 wt %. In one specific embodiment, Zn is dissolved or suspended within the acidic solution such that the Zn is coated on the surface of the granule rather than, or in addition to, Zn co-granulated within the granule.

Alternatively, acidic solutions, with or without Zn dissolved within, can be incorporated during the production of the fertilizer by any of the means typically used for micronutrient incorporation, including, for example, being added, such as by spraying, to recycle fines returned to a granulator, dissolved in a phosphoric acid feed to a preneutralizer and/or reactor, or dissolved in scrubber water that is returned to the preneutralizer and/or reactor. Again, such methods lower the pH of the granules and/or complex with the Zn, ultimately resulting in increased water solubility and availability of Zn in the fertilizer formulation.

The added moisture from the acidic solution is removed from the granules either naturally (e.g., passive evaporation) or with the application of energy. This can be accomplished either during the optional tumbling and/or after tumbling of the granules. The drying can be done by drying via a dry airstream (heated or non-heated) such as a fugitive dust air stream for removal of water vapor, dust, and air, a heated dryer such as a blower, until a final moisture content of about 0 wt % to about 6.5 wt % of the granules is achieved, more particularly from about 0.5 wt % to about 3.0 wt %, and even more particularly from about 0.5 wt % to about 1.5 wt %, resulting in fertilizer granules.

The process can be placed in-line after granulation and/or drying of the fertilizer granules, or at a remote location, i.e. off-line. For example, treatment with an acidic solution can be achieved in a warehouse, separate processing facility, at a transportation site, or any of a variety of locations.

The treatment of granular fertilizers with an acidic solution as described above increases Zn solubility and availability, thereby enhancing Zn uptake into a plant in a manner that is independent of the amount of Zn available in the soil. Treatment of granular fertilizers with an acidic solution as described above also allows for better adhesion and more uniform coverage of the acidic solution over the fertilizer granules, which lowers the pH of the granule and/or complexes or chelates the Zn. Ultimately, the treatment of granular fertilizers with an acidic solution as described above increases the amount of water-soluble Zn, which in turn, increases the efficiency of Zn uptake and reduces the costs and equipment otherwise needed to mitigate Zn deficiencies.

The treatment methods and systems described above are not limited to the treatment of fertilizer granules. The methods and systems according to embodiments can be used on any granular or particulate material containing Zn or other micronutrients. Other uses can include, for example, the treatment of coal, feed products, such as feed supplements, or pellets, food processing, mining operations including ores and tailings, cured or dried cement, dirt, gravel or sand, waste, asbestos, or any of variety of uses.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

DETAILED DESCRIPTION OF THE DRAWINGS

Figure 1:
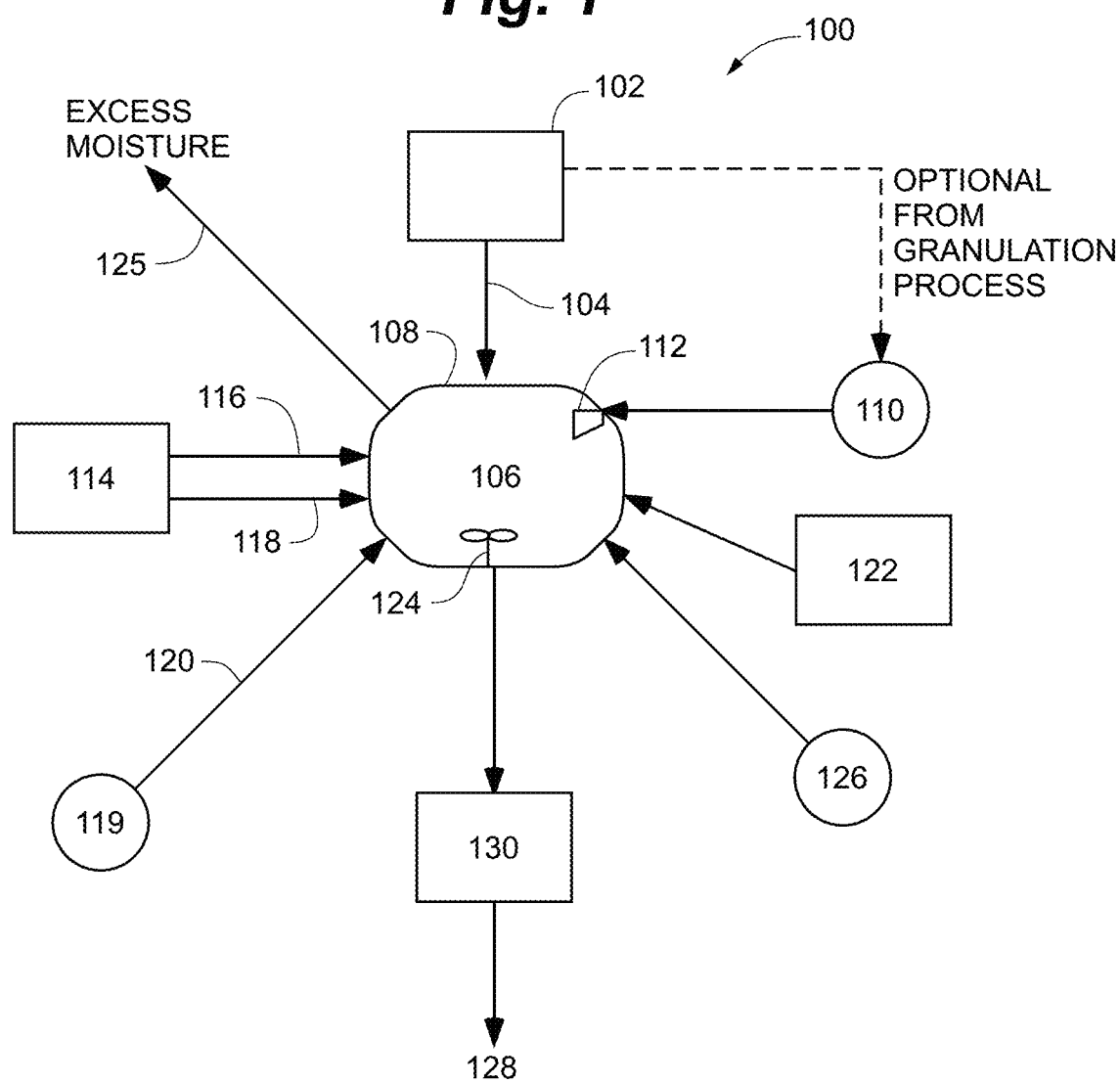
FIG. 1 is a process flow diagram illustrating a method for increasing Zn solubility and availability in fertilizer granules through acid treatment of the fertilizer granules according to an embodiment of the invention.

As illustrated schematically in FIG. 1, a process 100 for increasing Zn solubility/availability and uptake in plant roots is generally directed to post-treatment of fertilizer granules including Zn as a micronutrient. Generally, process 100 can comprise a granule formation step 102 in which a variety of granulation methods can be utilized. In granule formation step 102, a plurality of fertilizer granules 104 are formed and can comprise any of a variety of suitable fertilizer types including, but not limited to, inorganic varieties including primary nutrients that are nitrogen-based (e.g. ammonium nitrate or urea), phosphorous-based (e.g. phosphate fertilizers including mono-ammonium and di-ammonium phosphates), potassium-based (e.g. potash or MOP) fertilizers, or any of a variety of N—P—K compound fertilizers.

In granulation step 102, a Zn source is introduced so as to be incorporated into fertilizer granules 104 for co-granulation. The source of the Zn can include, but is not limited to, Zn sulfate heptahydrate, Zn sulfate monohydrate, Zn oxysulfate, Zn oxide, Zn chloride, Zn nitrate, ZnEDTA, or combinations thereof. In addition, granule formation step 102 can include the addition of a variety of additional secondary nutrients such as, for example, sulfur or sulfur compounds, calcium, and magnesium or optional micronutrients such as, for example, Fe, Mn, Zn, Cu, B, Mo, and/or Cl that can be incorporated into fertilizer granules 104.

Granule formation step 102 can be accomplished using any of a variety of different granulation methods. In one non-limiting embodiment, the fertilizer granules are formed using the granulation methods described in U.S. Pat. No. 6,544,313 entitled "Sulfur-Containing Fertilizer Composition and Method for Preparing Same," which is herein incorporated by reference in its entirety. In another non-limiting embodiment, the fertilizer granules are formed using the granulation methods described in U.S. Pat. No. 7,497,891 entitled "Method For Producing A Fertilizer With Micronutrients," which is also incorporated herein by reference in its entirety.

Referring again to FIG. 1, fertilizer granules 104 from the granule formation step 102 are placed into a treatment vessel 106 in a treatment step 108. For example, once fertilizer granules 104 have obtained a certain target temperature and moisture content in granule formation step 102, the fertilizer granules 104 can be placed into a post-granulation or post-manufacture treatment vessel 106 for further treatment to promote Zn availability and uptake in plant roots. Treatment vessel 106 can comprise a variety of differing vessel types and designs such as, for example, a tumbling drum or bed, a flighted drum or bed, or a fluidized bed.

In treatment step 108, an acidic solution 110 can be applied to and/or otherwise incorporated with the fertilizer granules 104 in order to facilitate an increase in the availability and water solubility of the Zn micronutrient. In one representative embodiment, treatment vessel 106 can include one or more sprayers 112 or nozzles for the spray application of one or more acidic solutions 110. The acidic solution 110 can comprise water or a water-based solution of one or more acidifying agents, complexing agents, and/or chelating agents, the solution being in the form of liquid, steam, and/or superheated steam, and with or without beneficial agricultural, biological, and/or dedusting additives described above.

The acidic solution 110 can be introduced at a temperature of about 32° F. to about 800° F. depending on the form and composition of the acidic solution 110, and more particularly from about 70° F. to about 170° F. when the acidic solution 110 is in the form of liquid water or a water-based solution. The acidic solution 110 can comprise suitable acidifying agents, complexing agents, and/or chelating agents such as, for example, but not limited to, citric acid, oxalic acid, sulfamic acid, sulfuric acid, phosphoric acid, acetic acid, nitric acid, cyclohexanediaminepentaacetic acid, diethylenetriaminepentaacetic acid, ethylenediaminedi-aminedi-o-hydroxyphenylacetic acid, ethylenediamintetraacetic acid (EDTA), ethylene glycol bis(2-aminoethyl ether) tetraacetic acid, hydroxyethylenediaminetriacetic acid, nitrilo-triacetic acid, pyrophosphoric acid, triphosphoric acid, or combinations thereof.

Generally, the acidic solution 110 can be applied to the fertilizer granules 104 at concentrations ranging from about 0.1 wt % to the particular solubility limit of the acidic solution 110. In some embodiments, it is advantageous to use the highest concentration of acidic solution 110 as possible in order to decrease the amount of effort required to remove excess moisture from the fertilizer granules 104.

Depending on the temperature and moisture content desired for the fertilizer granules 104 prior to application of the acidic solution 110, a heating step 114 may be necessary or desirable. In heating step 114, heat energy 116 and or heated/dry air 118 can be applied or otherwise introduced to treatment vessel 106 and ultimately, fertilizer granules 104. For example, heat energy 116 can comprise IR heat, gas fired heat, or any of a variety of heat sources that can be applied to the plurality of fertilizer granules 104 to dry and/or heat the granules to a desired target surface temperature and/or moisture content before application of the acidic solution 110 to the fertilizer granules 104. In one embodiment, a desired target surface temperature of the fertilizer granules 104 can be approximately about 50° F. to about 250° F., and more particularly about 130° F. to about 200° F. In another embodiment, a desired target moisture content for the fertilizer granules 104 is about 0 to about 6.5 weight percent (wt %), more particularly from about 0.5 wt % to about 3.0 wt % and more particularly from about 0.5 wt % to about 1.5 wt %.

In some representative embodiments, the acidic solution 110 can optionally contain one or more beneficial agricultural, biological and/or dedusting additives, such as those detailed in PCT Application No. PCT/US2015/039302, and PCT Publication Nos. WO2015/026806 A1 and WO2011/109202 A1, all of which are incorporated by reference above in their entireties. For example, the beneficial agricultural, biological, and/or dedusting additives can be present in amounts of about 0.01 wt % to about 99.99 wt % of solution, and more particularly from about 20 wt % to about 50 wt % of solution.

In addition to or as an alternative to the beneficial agricultural and/or dedusting additives listed above, the acidic solution 110 can contain one or more primary nutrients, secondary nutrients, and/or micronutrients in an amount of about 0.01 wt % to about 99.99 wt % of solution, and more particularly from about 20 wt % to about 50 wt % of solution. The secondary nutrients can include, for example and without limitation, elemental S, S compounds, Ca, and/or Mg, and the micronutrients can include, for example and without limitation, Fe, Mn, Zn, Cu, B, Mo, and/or Cl.

In an alternative embodiment, an additive step 119 can comprise the addition of one or more of the beneficial agricultural, biological, and/or dedusting additives described above and can be optionally introduced in an additive stream 120 that is applied onto the surface of the fertilizer granules 104 separate from treatment with the acidic solution 110 in treatment vessel 106. The one or more beneficial agricultural and/or dedusting additives can be added simultaneously or in series with (e.g., upstream and/or downstream from) the acidic solution 110, such as by spraying, in treatment vessel 106.

In one non-limiting embodiment, the acidic solution 110 can be added in an amount of about 0.1 to about 10 wt % of the total weight of the fertilizer granules 104, and more particularly from about 0.1 to about 5.0 wt % of the total weight of the fertilizer granules 104. This can be accomplished, for example, by the addition of the acidic solution 110 at a rate of about 0.2 to about 22 gallons per ton of fertilizer granules 104, and more particularly about 5-10 gallons per ton of fertilizer granules 104. The amount of acidic solution 110 to be applied to the fertilizer granules 104 will generally depend on the composition or concentration of the acidic solution 110, and the desired amount of acidic solution 110 per fertilizer granule 104 and desired pH of the fertilizer granule 104. In some embodiments, the source of the acidic solution 110 that is added to treatment vessel 106 can be an acid stream from acid tanks utilized in formation step 102. When acidic solution 110 is provided from tanks utilized in the formation step 102, acidic solution 110 can further comprise secondary nutrients and/or micronutrients, including Zn, that were dissolved into the acidic solution 110 as part of an acid feed stream to a reactor/granulator utilized to form fertilizer granules 104.

In another embodiment, mechanical energy 122 can be applied within the treatment vessel 106 either simultaneously with or after the application of the acidic solution 110. Mechanical energy 122 can be applied to the fertilizer granules 104 in the form of agitation, such as shaking and/or tumbling, within treatment vessel 106 to promote or induce mechanical interaction between individual fertilizer granules 104. In some embodiments, treatment vessel 106 can further include mixing equipment 124 such as, a ribbon blender, paddle mixer, baffles, and/or can comprise a rotating drum such that the application of the acidic solution 110 is spread evenly over the fertilizer granules 104, and to further induce mechanical interaction between the individual fertilizer granules 104.

In another alternative embodiment, treatment vessel 106 can comprise a fluidized bed reactor into which the fertilizer granules 104 and the acidic solution 110 are introduced. In a fluidized bed reactor, the surface of each individual fertilizer granule 104 is subjected to surface treatment with the acidic solution 110, as described above, without necessarily being subjected to particle to particle interaction or exposure to mechanical energy 122. Optionally, one or more beneficial agricultural and/or dedusting additives can be added to the fluidized bed reactor separately from the acidic solution 110, either with or without additives depending upon the source of the acidic solution 110.

During and/or after the optional application of mechanical energy 122, any extra moisture introduced from the application of the acidic solution 110 can be removed in a moisture removal stream 125. In one embodiment, moisture removal stream 124 does not require additional equipment and/or processing. For example, a previously established airflow, such as, for example, a ventilation means or duct for removing fugitive dust, water vapor, or other ventilation such as a fluid bed dryer, moves air that is sufficiently dry through treatment vessel 106 to remove the added moisture in moisture removal stream 124. In another representative embodiment, one or more drying gases 126 can be supplied to or moved through treatment vessel 106 to remove excess moisture from the fertilizer granules 104. The one or more drying gases 126 can be, for example, recycled and/or fresh air, and/or an inert gas such as argon or nitrogen. The one or more drying gases 126 can be completely dry, or have a low or negligible moisture content. In another embodiment, the one or more drying gases 126 includes one or more beneficial agricultural and/or dedusting additives or agents as described above for application to a surface of the fertilizer granules 104.

In yet another embodiment, the latent heat of the fertilizer granules 104 within treatment vessel 106 is sufficient to dry the fertilizer granules 104 by evaporation of the excess moisture (i.e., naturally) to the surrounding atmosphere of treatment vessel 106. The air of treatment vessel 106 can be removed and replaced as needed. In another representative embodiment, the fertilizer granules 104 can be subjected to the application of dry air and/or heat in a separate drying vessel (not shown), such as, for example, a fluid bed dryer. In each of these embodiments, the moisture added via the introduction of acidic solution 110 is removed until the fertilizer granules 104 have a final moisture content of about 0 to about 6.5 weight percent (wt %), more particularly from about 0.5 wt % to about 3 wt % and more particularly from about 0.5 wt % to about 1.5 wt %, resulting in acid treated fertilizer granules 128. Generally, the acidic solution 110 can be applied to the fertilizer granules 104 as described above at concentrations ranging from about 0.1 wt % to the particular solubility limit of the acidic solution 110. In some embodiments, it is advantageous to use the highest concentration of acidic solution as possible in order to decrease the amount of effort required to remove moisture from the granules.

The acid treated fertilizer granules 128 can be removed from the treatment vessel 106 at removal step 130. Following removal step 130, the acid treated fertilizer granules 128 can be shipped to storage and/or end-use customers, or can be re-treated or further treated with acidic solution 110, or further processed as desired.

Treatment of fertilizer granules 104 with the acidic solution 110 as described above provides for strong adhesion and more uniform distribution of the acidic solution 110 to the fertilizer granules 104. For example, acidifying the granules lowers the pH of the fertilizer granules 128 which increases the amount of water-soluble Zn within the acid treated fertilizer granules 128 that is available to plants. In other embodiments, treatment of fertilizer granules 104 with the acidic solution 110 described above increases Zn availability and solubility through a mechanism comprising, in part, the chelation (i.e., forming complexes) of Zn, which protects the Zn from precipitating or from forming water insoluble salts. The acidic solution 110 can also promote complex formation between a macronutrient (e.g., phosphate) and/or Zn, which protects the Zn from precipitating or from forming water insoluble salts. In other embodiments, treatment of fertilizer granules 104 with the acidic solution 110 described above increases Zn availability and solubility through a mechanism that increases the amount of water-soluble Zn that is available on the surface of acid treated fertilizer granule 128. For example, the acidic solution 110 can promote the conversion of water insoluble Zn in the fertilizer granules 104 into a form that is water soluble in acid treated fertilizer granules 128. Regardless of the mechanism, the treatment of fertilizer granules 104 with the acidic solution 110 as described above increases the amount of water-soluble Zn, which in turn, increases the efficiency of Zn uptake and reduces the costs and equipment otherwise needed to mitigate Zn deficiencies. The increased Zn availability and solubility of the acid treated fertilizer granules 128 enhances Zn uptake into a plant in a manner that is independent of the amount of Zn available in the soil.

Figure 2:
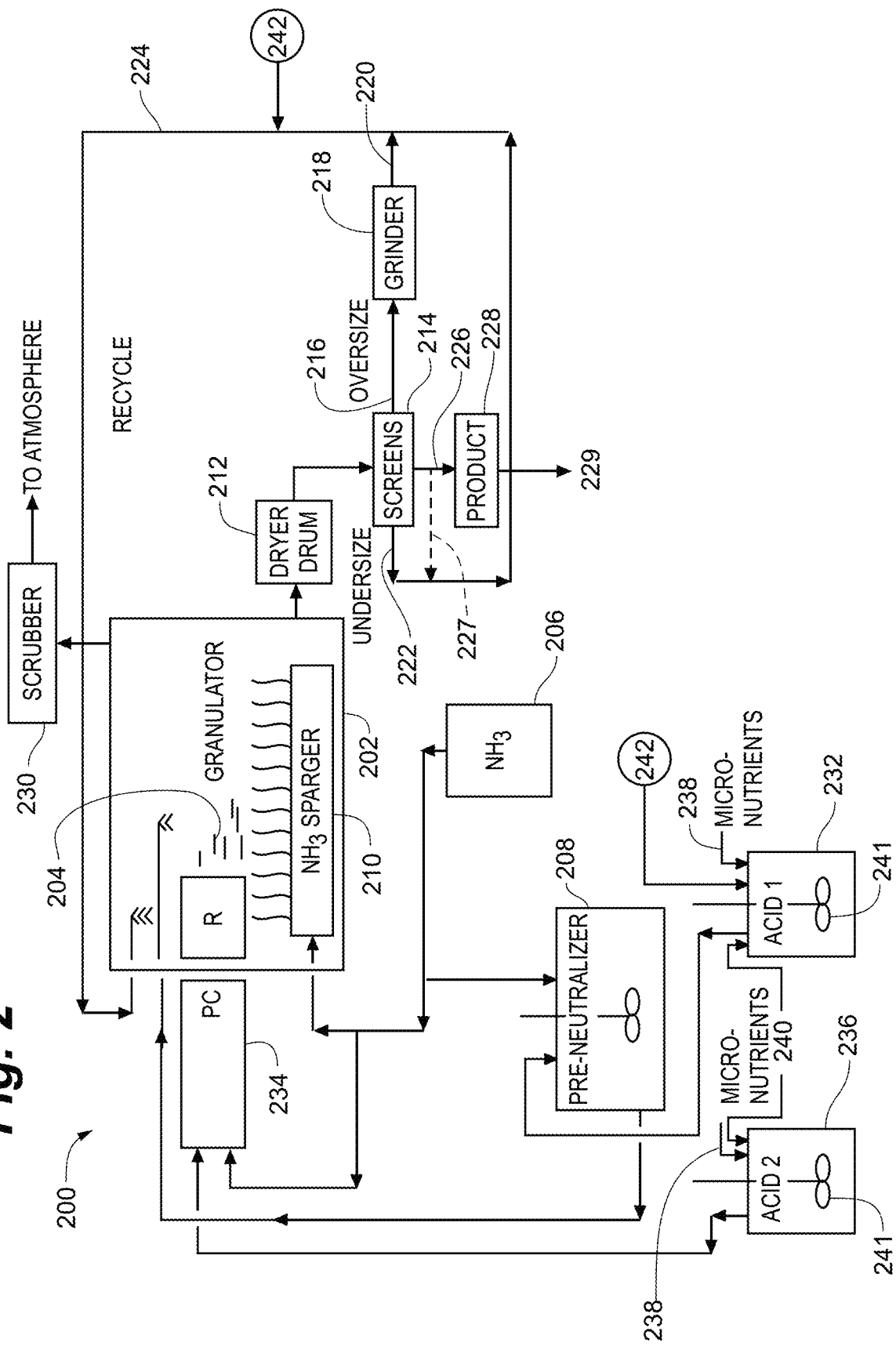
FIG. 2 is a process flow diagram illustrating a method for forming an acidified fertilizer granule having increased Zn availability according to an embodiment of the invention.

In a second alternative process 200 as illustrated in FIG. 2, acidic solutions can be incorporated during the formation of fertilizer granules using various introduction and application means that are typically used for micronutrient incorporation, including, for example, being added to recycle fines returned to a granulator, dissolved in a phosphoric acid feed to a preneutralizer and/or reactor or dissolved in scrubber water that is returned to the preneutralizer and/or reactor.

As shown in FIG. 2, process 200 can include a granulator 202, for example, a rotatable granulation drum reactor, containing fertilizer granules 204, for example, MAP, DAP, or combinations thereof). The granulator 202 rotates to form a rolling bed of the fertilizer granules 204. Solid sulfates such as, for example, calcium sulfate, magnesium sulfate, ammonium sulfate, and combination thereof, can be fed to granulator 202 using a belt feeder or similar conveying or feed means. These sulfates, which can be incorporated into a final product, can be immediately available for plant sulfur nutrition when the final product is applied to soil. As granulator 202 rotates, the contents of granulator 202 can be first sprayed with elemental sulfur in the form of a molten, low pressure spray to form thin sulfur platelets on the surface of the fertilizer granules 204. Spraying conditions, including spray pressure and spraying time, can be selected such that the sulfur platelets do not cover the entire surface of the fertilizer granules 204 to facilitate adhesion of a subsequently applied slurry to the underlying fertilizer granules 204.

Following formation of the sulfur platelets, the still-rotating, platelet-bearing fertilizer granules 204 can be sprayed with molten slurry prepared by combining ammonia from ammonia tank 206 and phosphoric acid in a pre-neutralizer 208, and then transferring the slurry to granulator 202 where it can be atomized to form a spray. The slurry is a fertilizer precursor that can be transformed into MAP, DAP, or a combination thereof upon ammonia sparging within the granulator 202. The slurry spraying conditions, including spray pressure and spraying time, can be selected based upon the desired thickness of fertilizer following ammonia sparging. Once slurry spraying is complete, the coated particles can be subjected to an ammonia sparge to convert the slurry to MAP, DAP, or a combination thereof. Under-bed ammonia sparger 210 is supplied with ammonia from ammonia tank 206. The concentration of ammonia can be selected to achieve a nitrogen to phosphate ratio, for example, of about 1.0 (in the case of MAP) or about 2.0 (in the case of DAP), at which point insoluble fertilizer particles form and precipitate out of solution.

Following the ammonia sparge, fertilizer particles can be dried in heated drying drum 212 to remove moisture and any other volatile material using heat or some other suitable source of energy. Following drying, the fertilizer particles can be discharged to a particle screener 214 equipped with one or more particle sizing screens. Particle screener 214 generally separates fertilizer particles that are too large and too small from fertilizer particles that have a pre-determined target size, from the product stream. Oversized particles 216 can be sent to a grinder 218. For this purpose, grinder 218 such as, for example, a roll mill, a chain mill, or other crushing device may be used to grind the oversized particles 216 to from ground particles 220. The ground particles 220 can be combined with undersized particles 222 and recycled back to the granulator 202 in a fines recycle stream 224. Particle screener 214 also separates a product stream 226 containing particles satisfying the predetermined target size. The product stream 226 can be cooled in a collector 228. Before being sent to the collector 228 for cooling, a portion of the correctly sized particles may be recycled back to granulator 202, together with the undersized particles and the ground oversized particles in the fines recycle stream 224. The potential recycling of correctly sized particles is labeled as stream 227. Any volatiles emitted during the cooling process, as well as volatiles that are emitted from drying drum 212 or the granulator 202 can be fed to a scrubber 230, wherein the emitted volatiles are treated before venting to the atmosphere. From the collector 228, an acidified fertilizer granule 229 can be shipped to storage and/or end-use customers, or can be retreated or further treated as desired.

Process 200 as shown in FIG. 2 can also involve the combination of a forward titration reaction and a pipe cross reactor reaction. Pre-neutralizer 208 can be supplied with phosphoric acid from a first acid tank 232 and ammonia from ammonia tank 206. The pipe cross reactor reaction occurs in pipe cross reactor (PCR) 234, which can be supplied with phosphoric acid from a second acid tank 236 and ammonia from the ammonia tank 206. Micronutrients 238 can be supplied to the fertilizer by first dissolving the micronutrients 238 in first acid tank 232 and/or the second acid tank 236. First and second acid tanks 232, 236 must generally be sufficiently well agitated to dissolve the micronutrients 238 in the corresponding acid.

In addition to the micronutrients 238, a sulfate source 240 may be added to one or both of first and second acid tanks 232, 236. One or both of first and second acid tanks 232, 236 can have baffles for increased mixing efficiency. The first and second acid tanks 232, 236 can be stirred with a propeller-type agitator 241. Although different temperatures can be used, it may be desirable for the first and second acid tanks 232, 236 to be heated to a temperature associated with the reaction temperature of the preneutralizer 208 and/or the PCR 234. Elevated temperatures also assist in dissolving the micronutrients 238. The temperature of the acid tanks 32, 36 may be in a range, for example, from about 140 to about 260° F.

Micronutrients 238 can comprise any of a number of suitable micronutrients but for purposes of the present invention, will be understood to include a least a Zn source. Representative Zn sources can include, for example, Zn sulfate heptahydrate, Zn sulfate monohydrate, Zn oxysulfate, Zn oxide, Zn chloride, Zn nitrate, ZnEDTA, or combinations thereof. In addition to the Zn source, one or more additional micronutrients 238 can be added as well, such as, for example, iron, manganese, Zn, copper, boron, molybdenum, and/or chlorine. In addition to adding at least a Zn source, one or more primary and/or secondary nutrients can be added in conjunction with micronutrients 238. Representative secondary nutrients can include, for example, sulfur compounds, calcium, and/or magnesium.

In order to produce an acidified fertilizer granule 229 so as to increase Zn availability for plant intake, the pH of the acidified fertilizer granule 229 can be reduced or controlled and/or the complexation or chelation of the Zn can be accomplished through the addition of an acidic solution 242 in various stages of process 200. For example, acidic solution 242 can be sprayed or otherwise added to the fines recycle stream 224 for return to the granulator 202. Alternatively, acidic solution 242 can be dissolved in the first acid tank 232 such that the acidic solution 242 is fed to the preneutralizer 208 and/or the PCR 234. Finally, acidic solution 242 can be introduced and dissolved into scrubber water (to prevent or reduce dust emissions to the atmosphere) that is returned to the preneutralizer 208 and/or PCR 234.

Acidic solution 242 can comprise any of a variety of suitable acidic solutions including one or more acidifying agents, complexing agents, and/or chelating agents such as, for example, but not limited to, citric acid, oxalic acid, sulfamic acid, sulfuric acid, phosphoric acid, acetic acid, nitric acid, cyclohexanediaminepentaacetic acid, diethylenetriaminepentaacetic acid, ethylenediaminedi-o-hydroxyphenylacetic acid, ethylenediamintetraacetic acid (EDTA), ethylene glycol bis(2-aminoethyl ether) tetraacetic acid, hydroxyethylenediaminetriacetic acid, nitrilo-triacetic acid, pyrophosphoric acid, triphosphoric acid, or combinations thereof.

Formation of the acidified fertilizer granule 229 as described above increases the amount of water-soluble Zn, which in turn, increases the efficiency of Zn uptake and reduces the costs and equipment otherwise needed to mitigate Zn deficiencies. The increased Zn solubility and then availability of the acidified fertilizer granule 229 can enhances Zn uptake into a plant in a manner that is independent of the amount of Zn available in the soil.

EXAMPLES

Now referring to FIGS. 3-8, the use of sulfuric acid coatings to increase solubility of Zn of a Zn-containing fertilizer was investigated. A sulfuric acid spray solution (1:1 concentrated sulfuric acid (95% $H_2SO_4$, specific gravity=1.84):demineralized water) was sprayed at five different spray rates equivalent to a sulfuric acid rate between 0 and 1.84 g/100 g fertilizer onto MicroEssentials® SZ™ fertilizer granules (hereinafter MESZ), ranging from 2.6 and 2.80 mm, in a stainless steel drum.

The acid solution was sprayed at the various rates through using a glass nebulizer spray nozzle and pump without external drying. The fertilizer granules were given spraying time to maintain good coverage and to allow for drying whilst rolling and were dry to the touch. The water- and acid-extractable Zn and pH (at S:L 1:250) were then measured on 10 separate granules.

Figure 3:
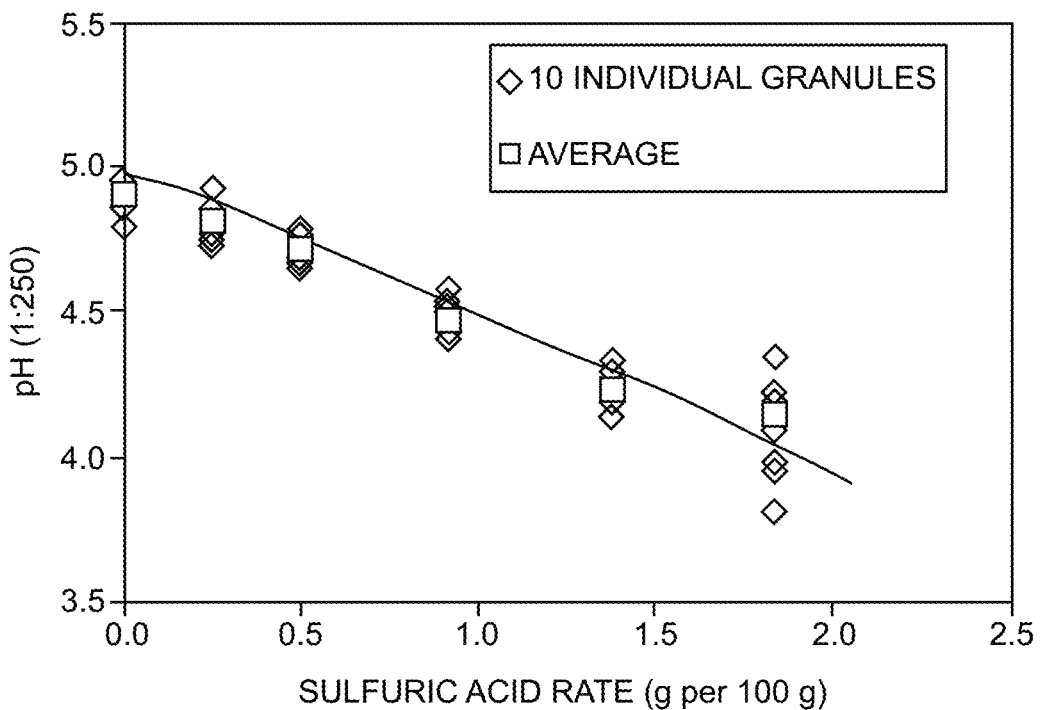
FIG. 3 is a graph depicting the pH of sulfuric acid sprayed fertilizer granules (sulfur and zinc containing ammonium phosphate) as a function of sulfuric acid rate applied to the granules (g of sulfuric acid applied to 100 g of granules).
Figure 4:
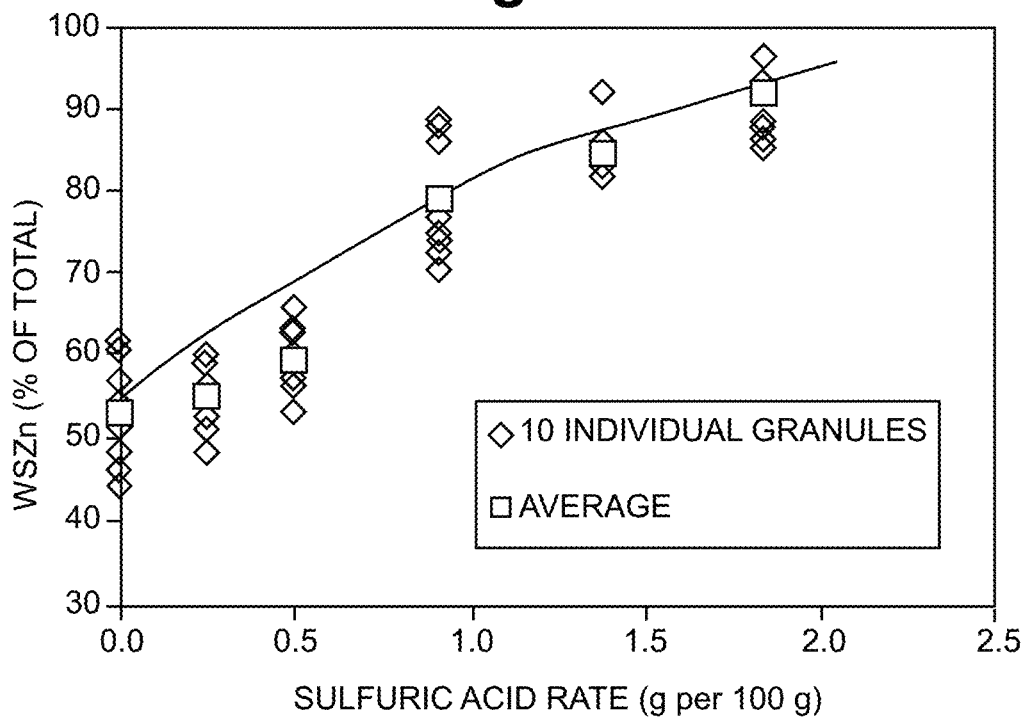
FIG. 4 is a graph depicting water-soluble Zn (% of total) as a function of the sulfuric acid rate applied to the granules of FIG. 3.
Figure 5:
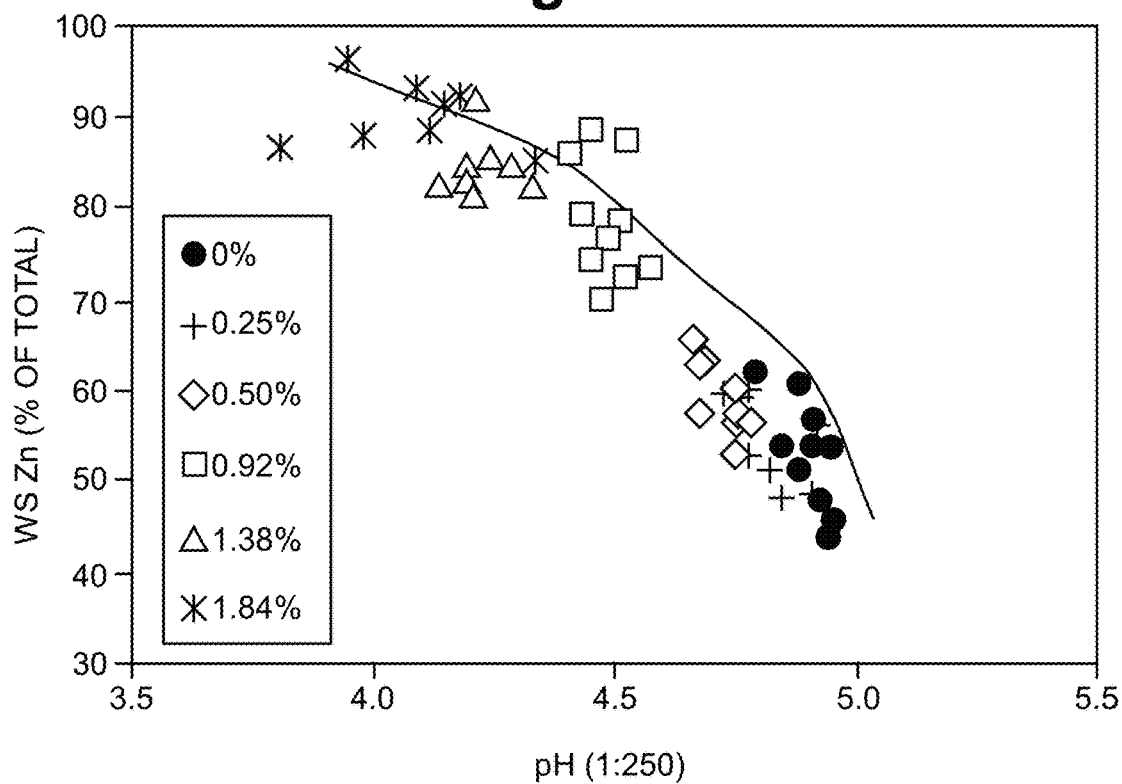
FIG. 5 is a graph depicting water-soluble Zn (% of total) as a function of granule pH for uncoated and sulfuric acid-coated granules of FIG. 3 (acid rate in % by weight in the legend).

As depicted in FIG. 3, as the sulfuric acid addition rate increased, the granule pH declined reaching an average pH of 4.1 at the highest coating rate used. As depicted in FIG. 4, the water soluble Zn percentage (hereinafter "% WS Zn") increased from 53% (at the initial uncoated granule pH of 4.9) to 92% at the highest acid rate. As depicted in FIG. 5, the % WS Zn as a function of pH followed a relationship in line with solubility controlled by hopeite ($Zn_3(PO_4)_2.4H_2O$), and according to thermodynamic predictions.

The acid coated MESZ granules coated at rates up to and including the 0.92 g per 100 g rate were homogenous, while the higher rate of 1.84 g per 100 g was heterogeneous, causing pH variations between 4.22 and 3.18 and % WS Zn between 85.3% and 100%, without any visible difference in coating coverage under an optical microscope.

Figure 6:
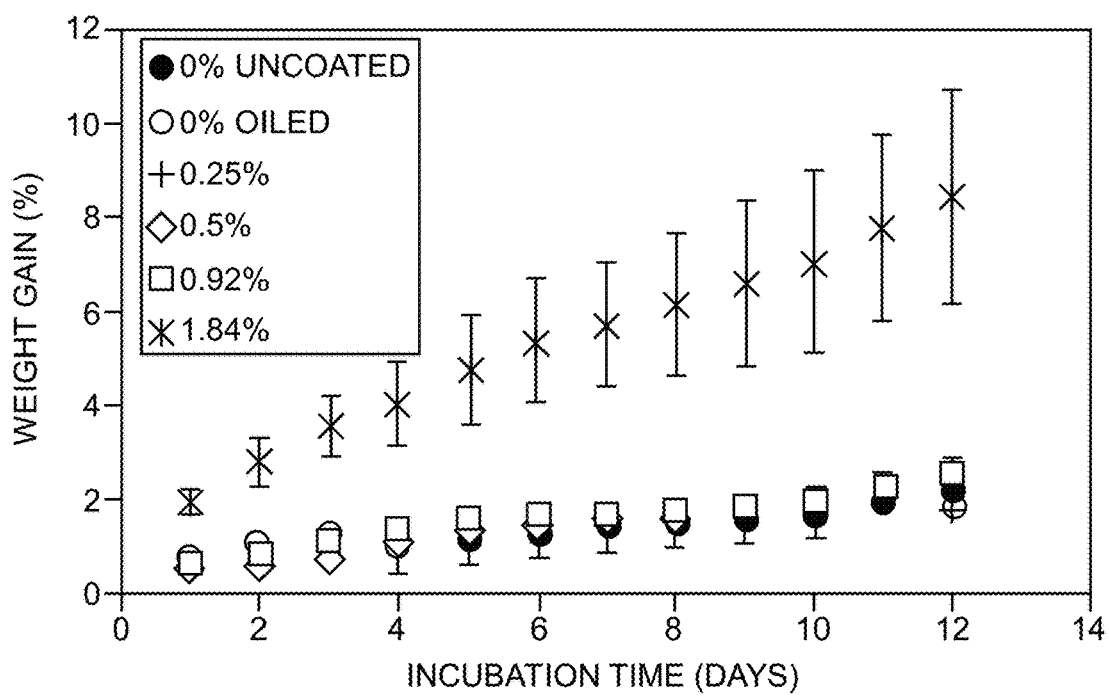
FIG. 6 is a graph depicting percentage weight gain of moisture of the uncoated and sulfuric acid-coated granules of FIG. 3 over 12 days at 85% relative humidity (error bars show standard deviation for 4 replicates).

Referring to FIG. 6, moisture uptake of the coated and uncoated granules at 85% relative humidity was measured by recording the weight increase over time for up to 12 days. The test was repeated four times. The granules with the highest rate of sulfuric acid coating absorbed an average of 8.5% moisture over the 12 days, and appeared wet, causing agglomeration. All other granules with lower to no coating absorbed much less moisture and gained between 1.8% (untreated MESZ) and 2.5% moister over the 12 days.

Figure 7:
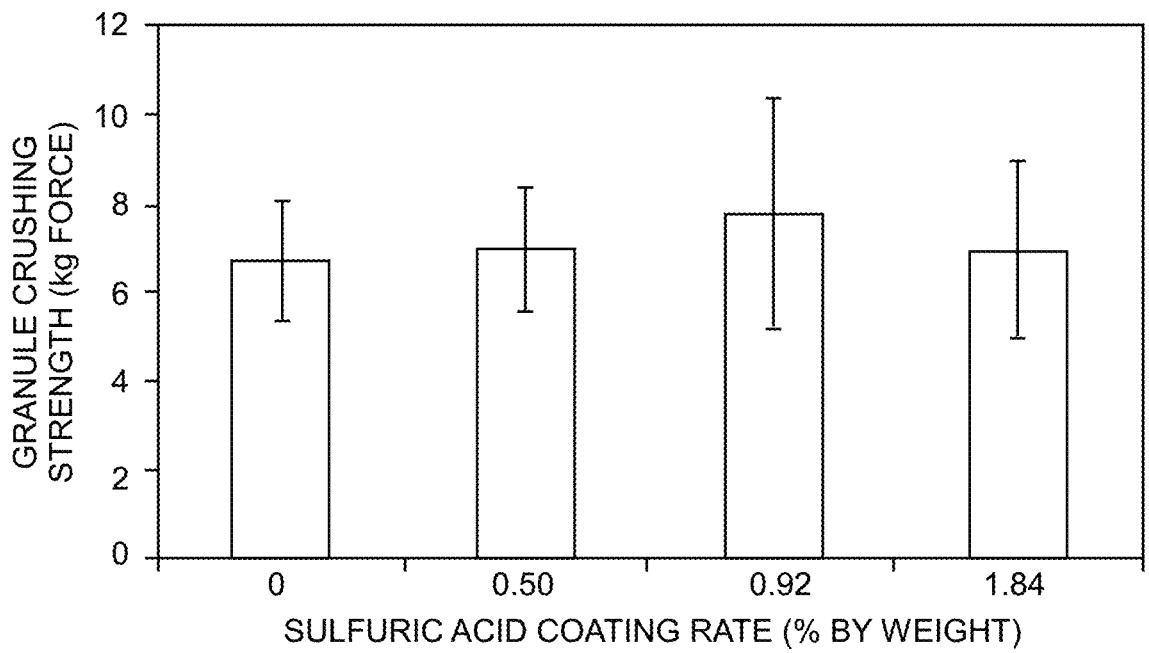
FIG. 7 is a graph depicting crushing strength for 30 uncoated and sulfuric acid-coated granules of FIG. 3 (average and standard deviation for 30 granules).
Figure 8:
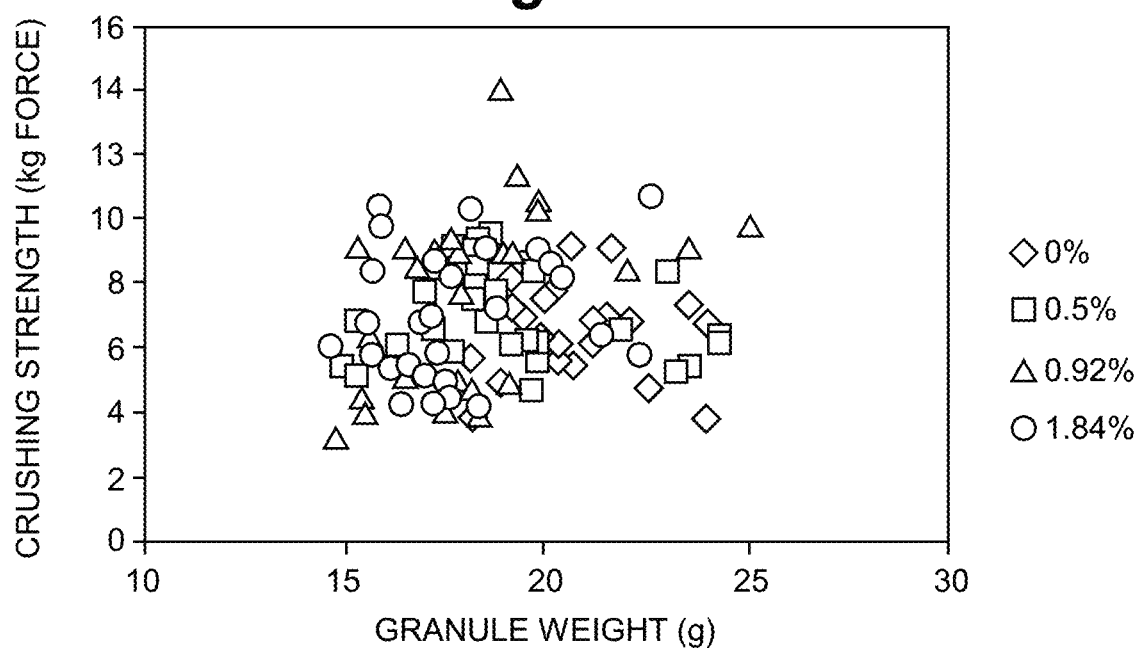
FIG. 8 is a graph depicting crushing strength (kg force) for 30 uncoated and sulfuric acid-coated granules of FIG. 3 (acid rate in weight % in legend).

Referring to FIGS. 7 and 8, there was no significant differences found in the granule crushing strength between the uncoated and any acid-coated treatment. Further, there was no relationship found between crushing strength and granule weight. The crushing strength was measured for 30 individual granules using a Proving ring penetrometer once a calibration relationship was established between the gauge and applied kg force for proving ring 2089.

Referring now to FIGS. 9-16, the effect of sulfuric acid coating on water solubility of fertilizer Zn and Zn diffusion in soil was investigated. The sulfuric acid was coated on the fertilizer by surface spraying, and the zinc was either co-granulated with the underlying fertilizer composition or dissolved in the sulfuric acid and coating on the granule. More specifically, the two modes of acidification and Zn inclusions, i.e. acid treatment of a zinc containing fertilizer (co-granulated Zn) and the addition of Zn via the sulfuric acid, were compared.

The following formulations in Table 1 below were used to coat the granules. For the granules in which the Zn was incorporated into the acid coating, ZnO was dissolved in sulfuric acid, or suspended in water for the control granules, and the solution was sprayed on the granules. More specifically, a 6 ml solution of 50:50 (w:w) concentrated sulfuric acid:demineralized water with the desired amount of Zn (using 99% ZnO) was sprayed onto 50 g of MES10 in a rotating drum with a nebulizer at a pump rate of 0.6/mil min. For the co-granulated Zn granules, granules were produced by milling MES10, blending and homogenizing with different amounts of ZnO, followed by granulation and air-drying. After size screening, the sulfuric acid was coated on 50 g samples of each batch by spraying the diluted acid solution onto the granules in a rotating drum.

TABLE 1

| Sample No. | Zn rate (wt %) | Conc. $H_2SO_4$ rate (wt %) |
|---|---|---|
| Co-granulated Zn/Zn coat | | |
| 1/13 | 0.5 | 0 |
| 2/14 | 0.5 | 0.75 |
| 3/15 | 0.5 | 1.0 |
| 4/16 | 0.5 | 1.5 |
| 5/17 | 0.5 | 2.0 |
| 6/18 | 0.75 | 0 |
| 7/19 | 0.75 | 1.0 |
| 8/20 | 0.75 | 1.5 |
| 9/21 | 0.75 | 2.0 |
| 10/22 | 1.0 | 0 |
| 11/23 | 1.0 | 1.5 |
| 12/24 | 1.0 | 2.0 |

Figure 9:
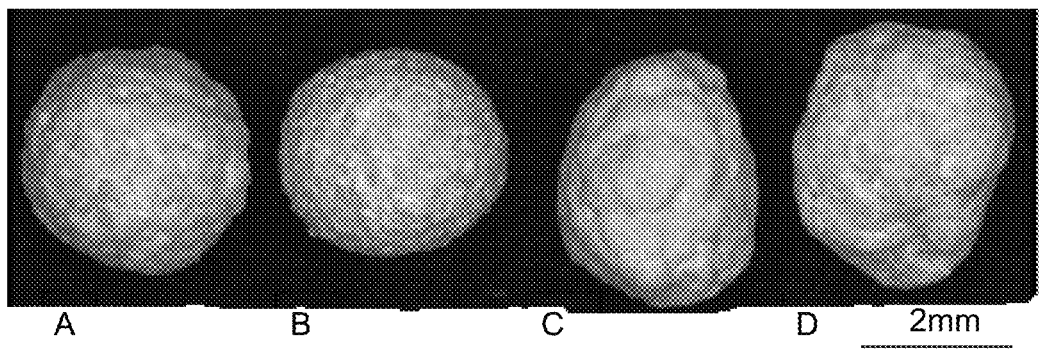
FIG. 9 is optical microscope images of: (A-B) 0.5% Zn co-granulated with a sulfur containing ammonium phosphate fertilizer with (A) 2% acid coating and (B) no acid coating; and (C-D) 0.5% Zn coated on a sulfur containing ammonium phosphate fertilizer with (C) 2% acid coating and (D) no acid coating.

Referring now to FIG. 9, granules A and B are 0.5% Zn co-granulated with MES10, with (A) a 2.0% acid coating, and (B) no acid coating. Granules C and D are 0.5% Zn coated on MES10 with (C) a 2.0% acid coating, and (D) no acid coating. The acid-coated granules A and C appeared smoother than the uncoated granules, which may impart significant handling benefits.

Figure 10:
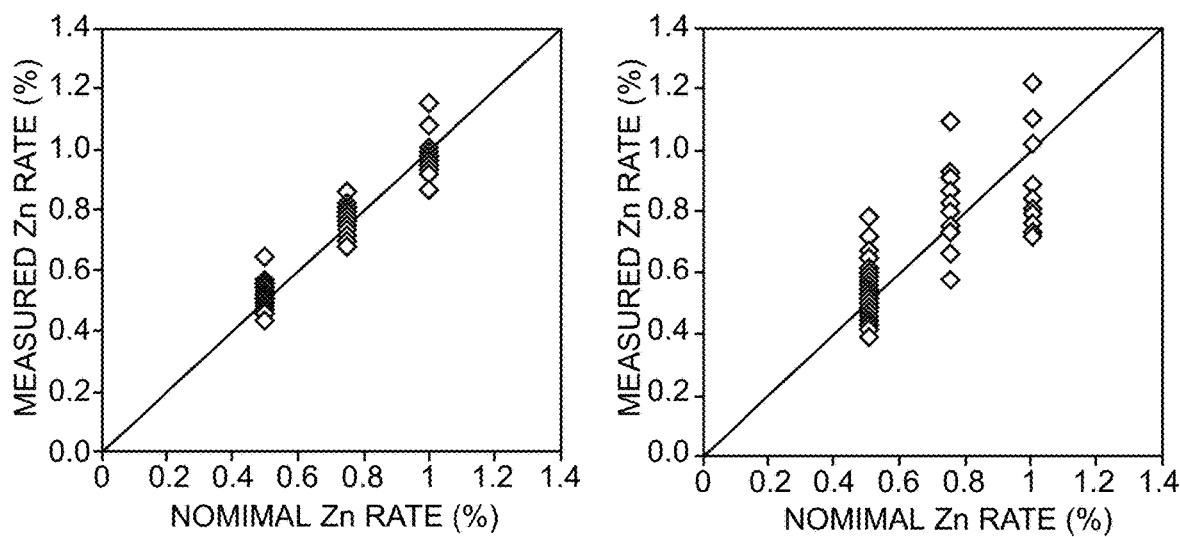
FIG. 10 are graphs depicting the measured Zn concentration versus the nominal Zn concentration of individual granules of the (A) co-granulated and (B) Zn-coated granules of FIG. 9.

Table 2 and FIG. 10 compare the measured total Zn concentration and the nominal rates, in which the variation was much larger for the coated granules than the co-granulated granules.

TABLE 2

| Nominal rates | | Zn co-granulated | | | Zn in (acid) coating | | |
|---|---|---|---|---|---|---|---|
| | | | | Total | | | Total |
| Zn (%) | Acid (wt %) | pH (1:250) | WSZn (%) | Zn (%) | pH (1:250) | WSZn (%) | Zn (%) |
| 0.5 | Nil | 5.29 | 0.19 | 0.51 | 5.26 | 0.17 | 0.42 |
| 0.5 | 0.75 | 5.00 | 0.31 | 0.59 | 5.05 | 0.35 | 0.54 |
| 0.5 | 1.0 | 4.89 | 0.30 | 0.46 | 4.96 | 0.40 | 0.56 |
| 0.5 | 1.5 | 4.66 | 0.43 | 0.54 | 4.80 | 0.44 | 0.55 |
| 0.75 | Nil | 5.30 | 0.25 | 0.76 | 5.31 | 0.21 | 0.62 |
| 0.75 | 1.0 | 5.12 | 0.41 | 0.85 | — | — | — |
| 0.75 | 1.5 | 4.71 | 0.61 | 0.80 | 4.88 | 0.68 | 0.84 |
| 0.75 | 2.0 | 4.55 | 0.66 | 0.80 | 4.72 | 0.71 | 0.79 |
| 1.0 | Nil | 5.33 | 0.23 | 1.05 | 5.30 | 0.20 | 0.85 |
| 1.0 | 1.5 | 4.97 | 0.78 | 0.95 | 5.01 | 0.63 | 0.94 |
| 1.0 | 2.0 | 4.89 | 0.73 | 0.96 | 4.82 | 0.65 | 0.84 |

Figure 11:
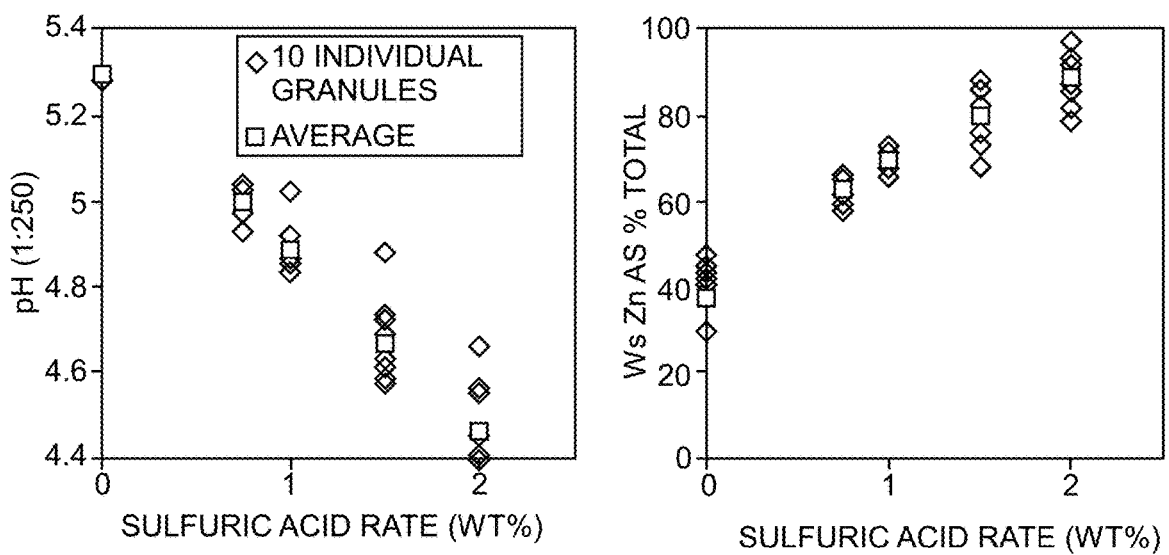
FIG. 11 are graphs depicting the pH or WS Zn (% of total) as a function of sulfuric acid rate (wt %) for the co-granulated granules with 0.5% Zn of FIG. 9.

Referring to FIG. 11 and Table 2, pH decreased and WS Zn % increased with increasing acid rates. The method of Zn incorporation (co-granulated vs. coated) made no significant difference to water solubility of Zn. At the same acid rate, the pH was higher at the higher Zn rates. For example, at a 2% sulfuric acid rate, the pH decreased from 5.3 to 4.5 at the 0.5% Zn rate, but only to 4.9 at the 1% Zn rate, which can be explained by the additional pH buffering of ZnO.

Figure 12:
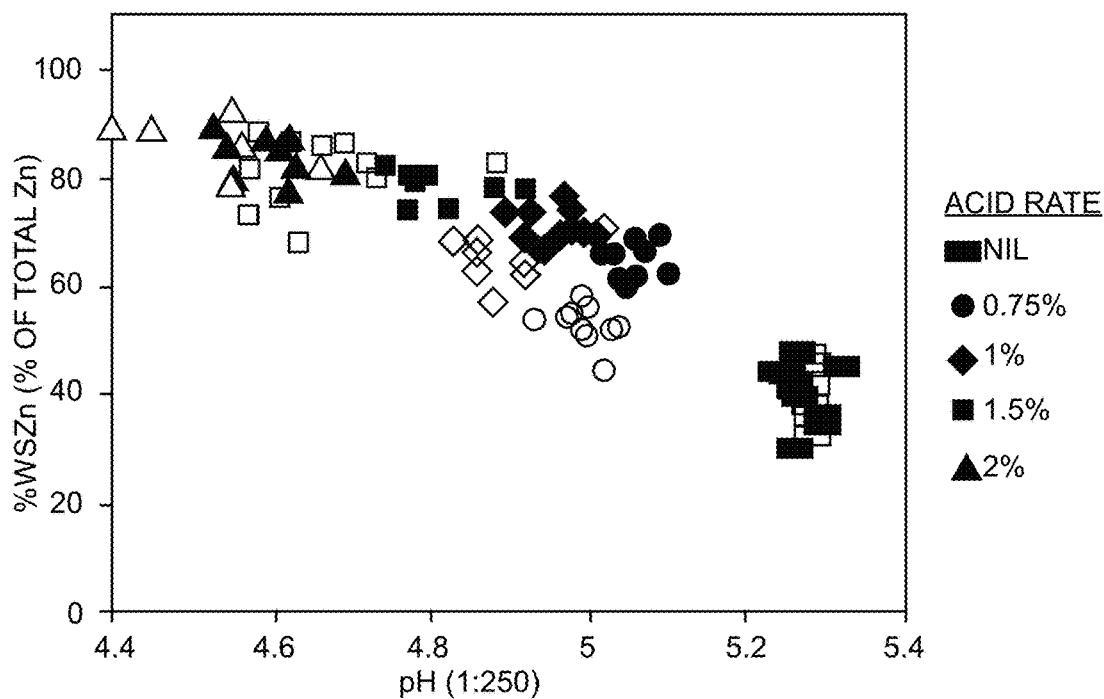
FIG. 12 is a graph depicting the pH-WS Zn relationship for all granules with 0.5% Zn (co-granulated and coated) of FIG. 9.
Figure 13:
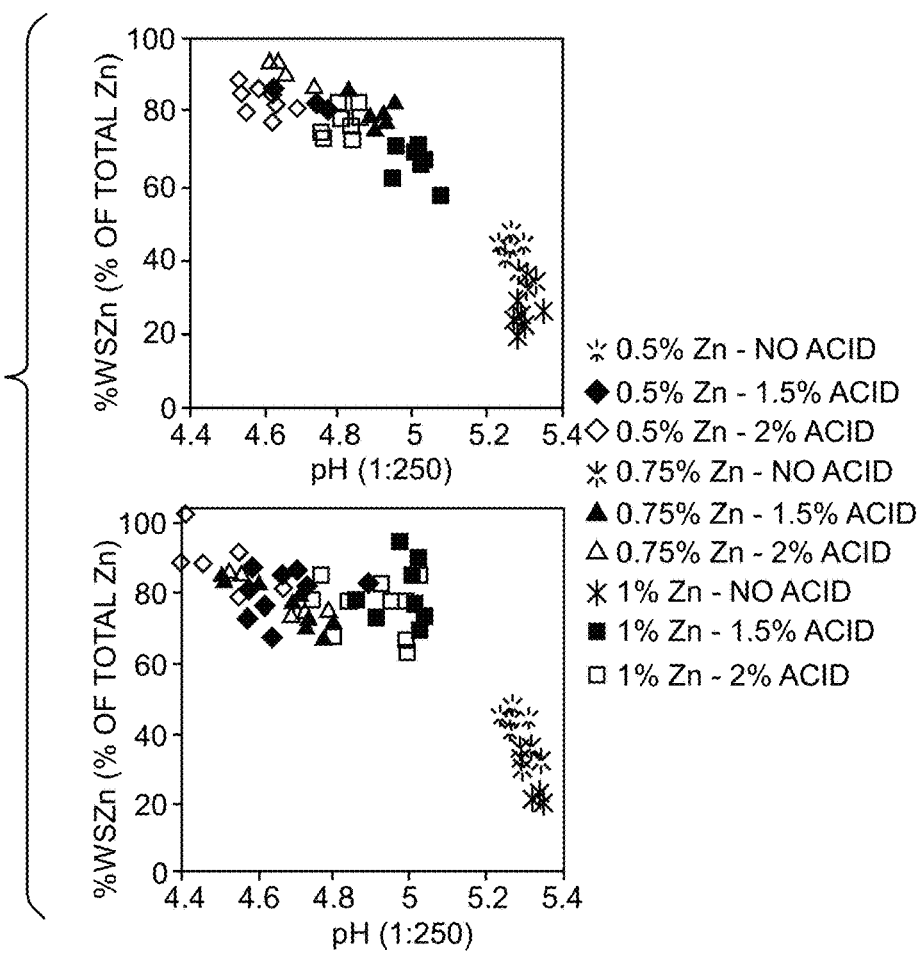
FIG. 13 is a graph depicting % WS Zn vs. pH for all Zn rates and the 0, 0.5, and 1.5% acid rates for both Zn-coated granules (left) and Zn co-granulated granules (right) (10 granules for each treatment) of FIG. 9.

Referring to FIG. 12, the pH-% Ws Zn relationship for all granules with 0.5% Zn, co-granulated or coated, shows no obvious differences between the co-granulated or Zn-coated granules. Referring to FIG. 13, the pH-% Ws Zn relationship for all Zn rates, without acid or with 1.5 or 2% acid coating shows that the % Ws Zn is lower as the Zn concentration is higher, which may be explained by hopeite solubility control. With a 1.5% or 2% acid coating, the pH is decreased to <5 and most Zn is solubilized, indicating that there are no differences in relative Zn solubility between the Zn rates at these lower pH values.

Figure 14:
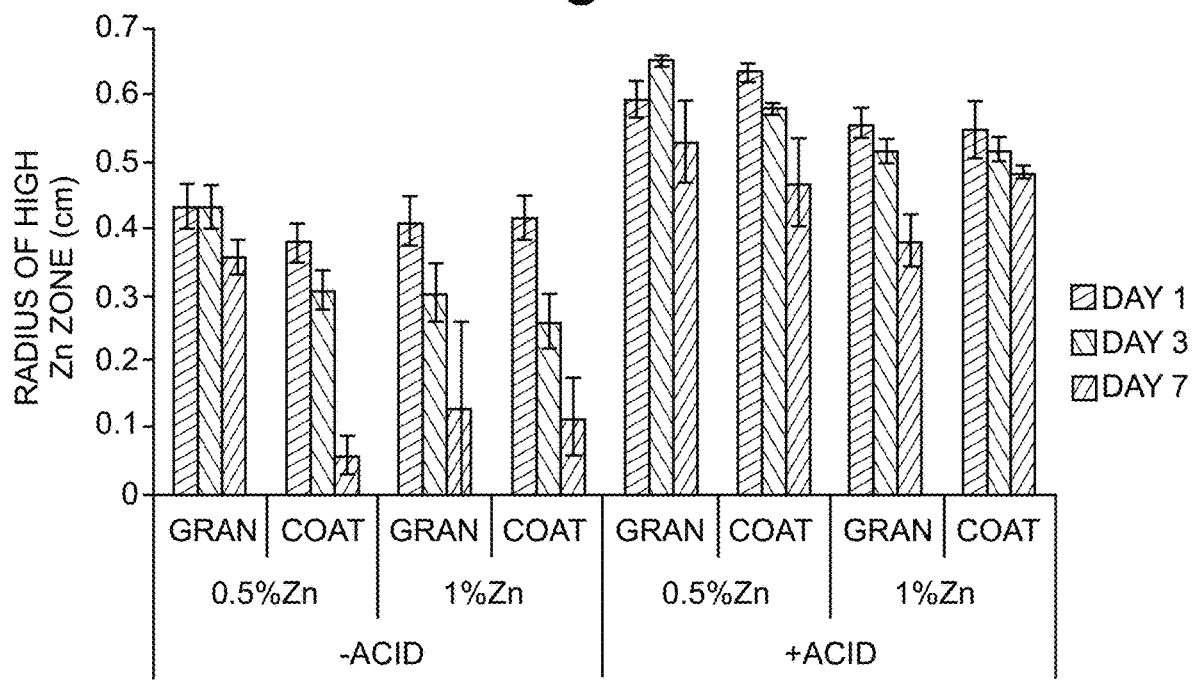
FIG. 14 is a graph depicting the radius of high Zn concentration at 1, 3, and 7 days after fertilizer application in Eneabba soil for Zn cogranulated and Zn-coated acid-treated and non-acid treated granules of FIG. 9.
Figure 15:
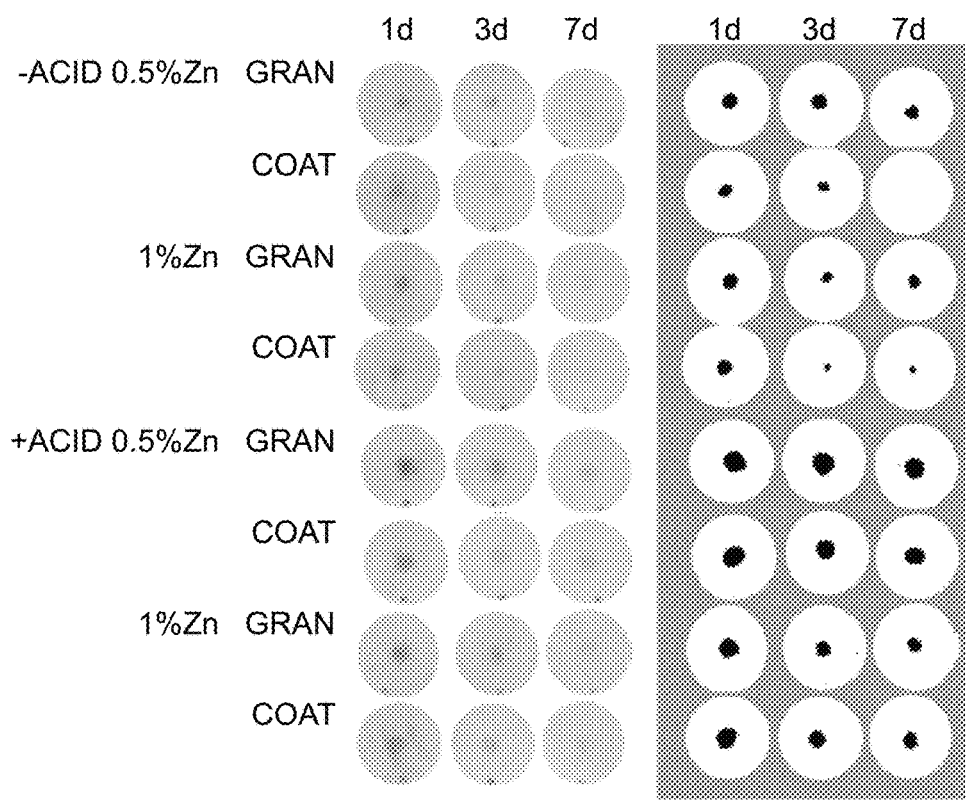
FIG. 15 is a visualized Zn diffusion zone at 1, 3, and 7 days after fertilizer application (left=original papers and right=image processing) for the granules of FIG. 9.
Figure 16:
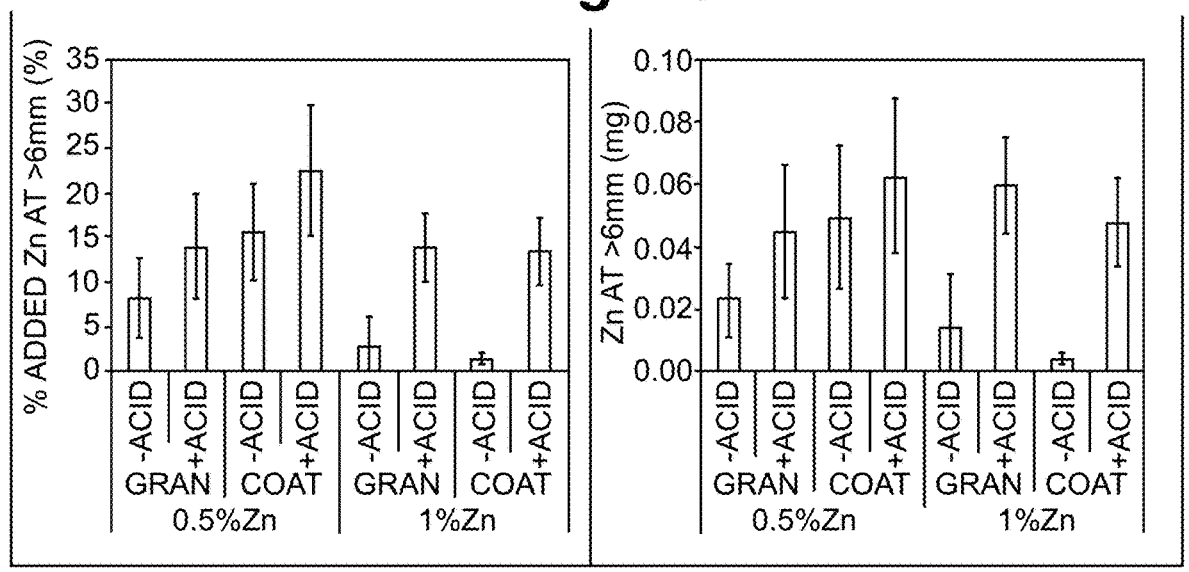
FIG. 16 is a graph depicting the percentage (left) and amount (right) of added Zn recovered at >6 mm from the fertilizer application site at 28 days after fertilizer application (error bars are standard error of 3 replicates) for the granules of FIG. 9.

FIGS. 14 and 15 depict the visualization results of Zn diffusion in the soil. The difference between the left and right hand sides of FIG. 14 show a significant correlation between acid treatment and Zn diffusion (i.e. the effect of acid addition was highly significant), while there was no significant difference in the diffusion zones between the co-granulated and coated products. There was a small, yet statistically significant effect of Zn rate with the lower Zn rate having a larger diffusion zone.

Pot Trial

Now referring to FIGS. 17-21, a pot trial using a calcareous soil, in which fertilizer (sulfuric acid coated MESZ) was added at 2.5 or 7.5 mg Zn/kg, and $ZnSO_4$ was added at 0, 0.25, 1, 2.5 or 7.5 mg Zn/kg. The plant used was corn (*Zea mays*, cv. Shemal). Plants were grown in pots with 3.1 kg of soil, and harvested at 44 days after planting. The dry matter yield and P and Zn concentrations in the plant shoot were measured.

Figure 17:
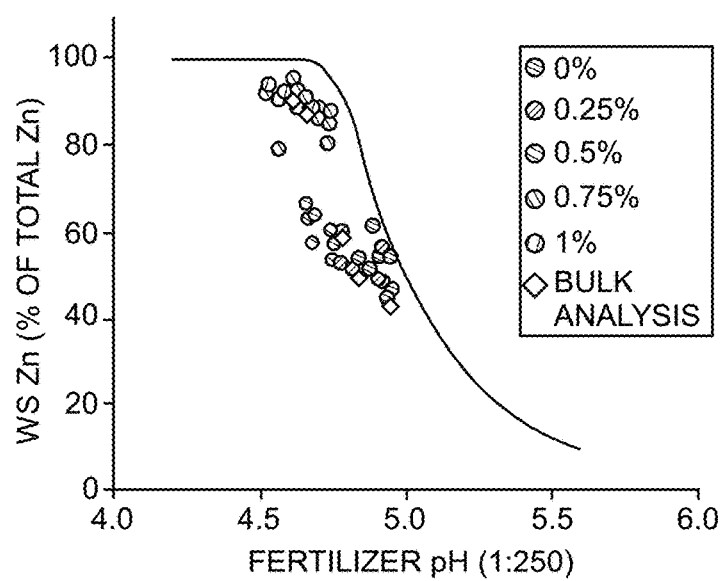
FIG. 17 is a graph depicting WS Zn (% of total) as a function of pH for a bulk sample analysis (white diamonds) and for individual granules (circles) for the acid-treated and un-treated fertilizer granules used in a pot trial.

Referring to FIG. 17, pH decreased and % WS Zn increased with increasing sulfuric acid rate, while showing variation between individual granules. Table 3 summarizes the chemical results.

TABLE 3 pH and water soluble Zn (as % of total Zn) of the sulfuric acid coated MESZ

| Fertilizer | $H_2SO_4$ rate (wt %) | pH (1:250) | WS/Total Zn (%) |
|---|---|---|---|
| 1 | 0 | 4.94 | 42 |
| 2 | 0.25 | 4.85 | 49 |
| 3 | 0.58 | 4.78 | 58 |
| 4 | 0.75 | 4.66 | 87 |
| 5 | 1.00 | 4.62 | 90 |

Figure 18:
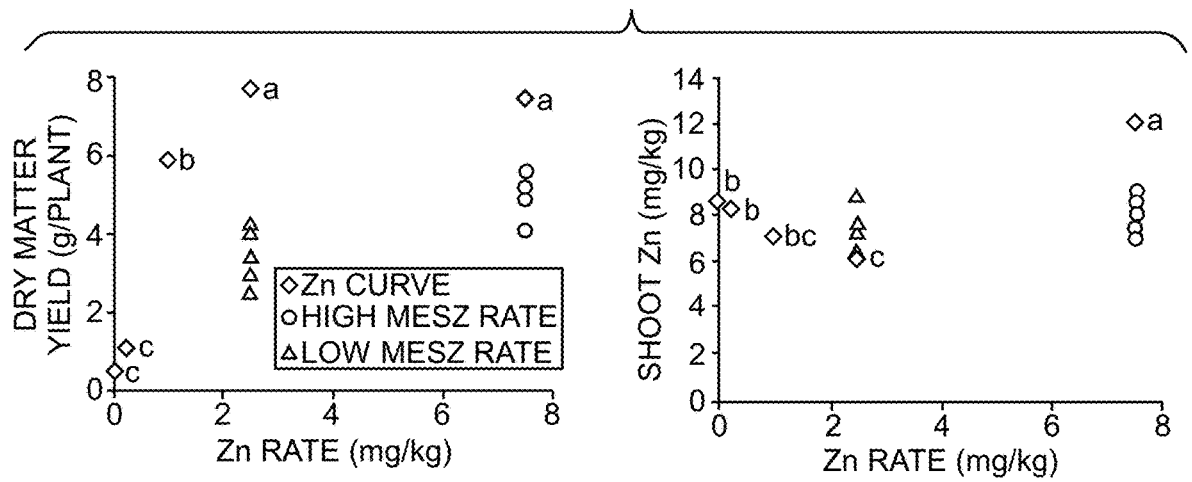
FIG. 18 is a graph depicting dry matter yield (left) and shoot Zn concentrations (right) as a function of the added Zn rate for the treatments with $ZnSO_4$ (Zn curve) and with a sulfur and zinc containing ammonium phosphate fertilizer at high and low rates used in the pot trial.
Figure 19:
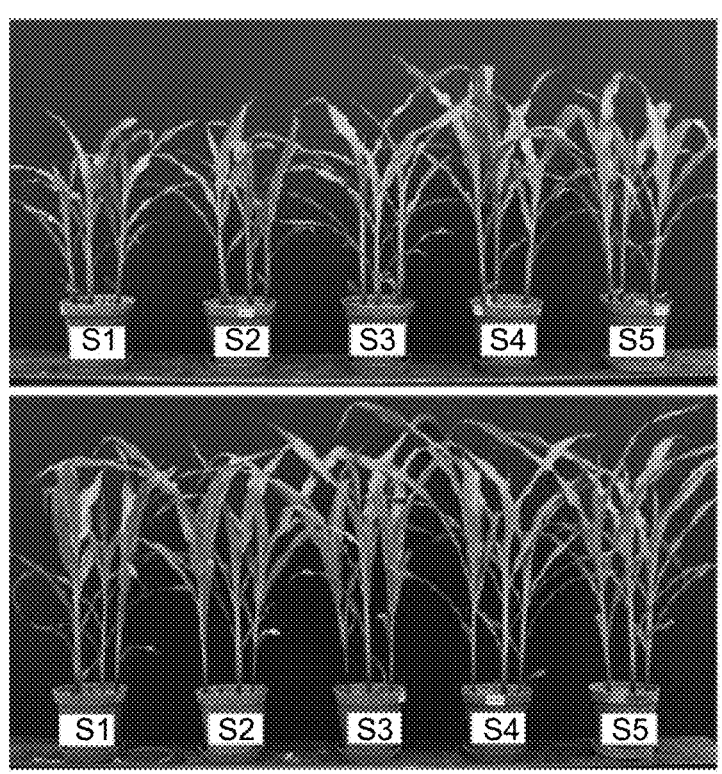
FIG. 19 is a visual depiction of shoot growth of plants of the fertilizers used in the pot trial with a low rate of Zn (2.5 mg Zn/kg—top) or high rate (7.5 mg Zn/kg—bottom).

FIG. 18 shows that dry matter yield increased in response to the $ZnSO_4$ application and the shoot Zn concentrations displayed the Piper Steenbjerg effect (Piper, 1942; Steenbjerg, 1951) in which the Zn concentration was significantly higher in the control treatment than at the 2.5 mg Zn/kg rate, which likely can be attributed to a dilution effect due to strong biomass increase. There was also a clear visual effect of fertilizer treatment on the shoot growth shown in FIG. 19.

Figure 20:
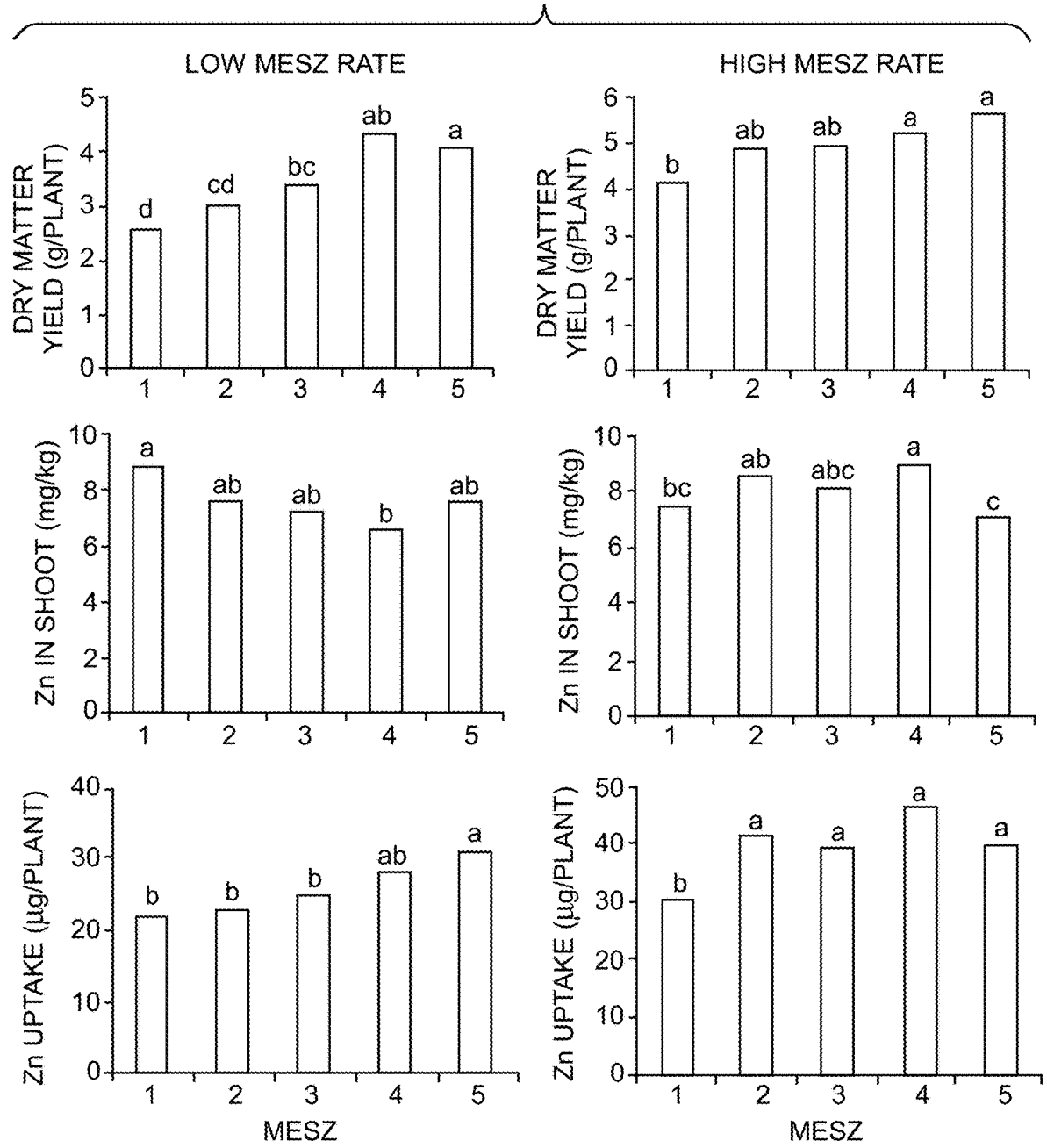
FIG. 20 are graphs depicting the effect of fertilizer treatment in the pot trail on dry matter yield of the shoot, the Zn concentration in the shoot, and the Zn uptake for the low rate of Zn (2.5 mg Zn/kg—left) or high rate (7.5 mg Zn/kg—right).
Figure 21:
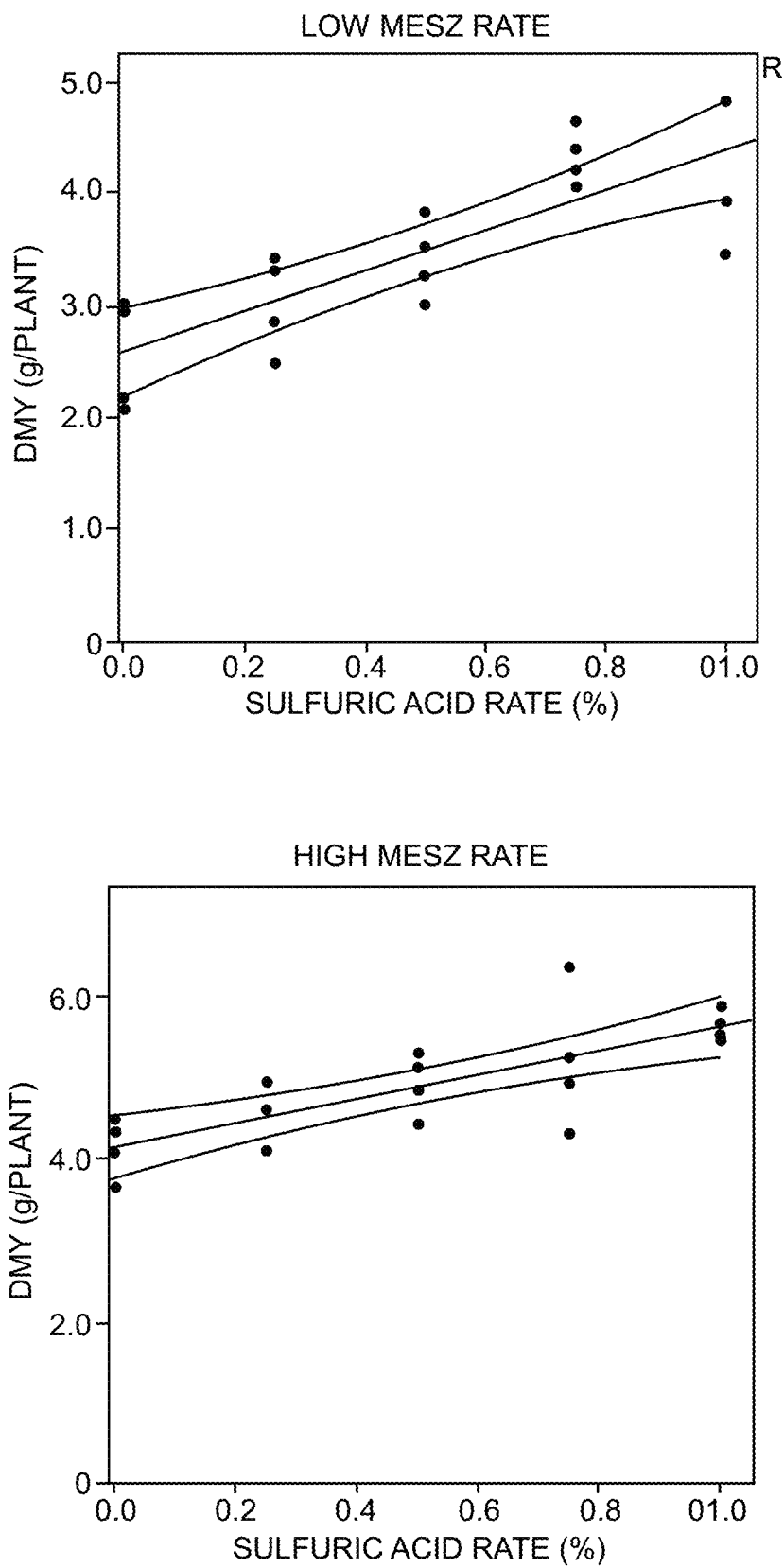
FIG. 21 are graphs depicting the dry matter yield of the pot trial as a function of sulfuric acid rate applied to the fertilizer for the low rate of Zn (2.5 mg Zn/kg—left) or high rate (7.5 mg Zn/kg—right).

Referring to FIGS. 20 and 21, at both the low and high MESZ rates (2.5 mg Zn/kg and 7.5 mg Zn/kg, respectively, the yield increased with decreasing fertilizer pH (increasing sulfuric acid rate), which was most pronounced at the lower rate, for which the yield increased by up to 69% compared to the uncoated MESZ, while at the higher rate, the yield increased by up to 36%. Shoot Zn concentrations decreased as yield increased at the lower MESZ rate such that the effect on Zn uptakes was not as pronounced as the effect on dry matter yield.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A granulated fertilizer product comprising:
a plurality of acidified fertilizer granules including a plurality of base granules, each base granule containing a macronutrient source and a source of zinc incorporated into the macronutrient source, wherein the macronutrient source comprises a phosphate containing fertilizer,
wherein each base fertilizer granule is acidified by direct application of liquid sulfuric acid to only an outer surface of the base fertilizer granule in an amount to increase zinc solubility thereby increasing availability of zinc for plant uptake.

2. The granulated fertilizer product of claim 1, wherein the liquid sulfuric acid is applied as an aqueous solution at concentrations ranging from about 0.1% to the solubility limit of the aqueous solution.

3. The granulated fertilizer product of claim 1, wherein a target moisture content of the fertilizer product is from about 0.5 wt % to about 6.5 wt %.

4. The granulated fertilizer product of claim 1, further comprising:
an additive selected from the group consisting of: a secondary nutrient, a micronutrient, a bio-stimulant, and combinations thereof.

5. The granulated fertilizer product of claim 4, wherein the additive comprises a secondary nutrient selected from the group consisting of a source of sulfur, a source of calcium, a source of magnesium, and combinations thereof.

6. The granulated fertilizer product of claim 4, wherein the additive comprises a micronutrient selected from the group consisting of: a source of iron, a source of manganese, a source of zinc, a source of copper, a source of boron, a source of molybdenum, a source of chlorine, and combinations thereof.

7. The granulated fertilizer product of claim 1, wherein the liquid sulfuric acid is present in an amount of about 0.1% to about 10 wt % of a total weight of each granule.

8. The granulated fertilizer product of claim 1, wherein the source of zinc is selected from the group consisting of: zinc sulfate heptahydrate, zinc sulfate monohydrate, zinc oxysulfate, zinc oxide, zinc chloride, zinc nitrate, ZnEDTA, and combinations thereof.

9. The granulated fertilizer product of claim 1, wherein the availability of the zinc for plant uptake is increased by chelation of the zinc by the liquid sulfuric acid.

10. The granulated fertilizer product of claim 1, wherein the availability of the zinc for plant uptake is increased by complex formation between the macronutrient and the zinc.

11. The granulated fertilizer product of claim 1, wherein availability of the zinc for plant uptake is increased by converting a water insoluble zinc source to a water soluble zinc source.

12. A method for increasing zinc solubility and consequently availability in fertilizer granules, comprising:
providing a granular fertilizer product comprising a plurality of base fertilizer granules, each base fertilizer granule formed of a macronutrient source and a source of zinc incorporated into the base fertilizer granule; and
applying liquid sulfuric acid directly to only an outer surface of the macronutrient source of the base fertilizer granules in an amount to increase zinc solubility thereby increasing availability of zinc for plant uptake.

13. The method of claim 12, wherein the sulfuric acid comprises an aqueous solution, and wherein the step of applying the sulfuric acid, further comprises:
spraying the aqueous solution onto the base fertilizer granules within a treatment vessel.

14. The method of claim 13, wherein the treatment vessel is selected from the group consisting of: a tumbling drum, a tumbling bed, a flighted drum, a flighted bed, and a fluidized bed.

15. The method of claim 13, wherein the aqueous solution is applied at a temperature in the range of about 32° F. to about 800° F.

16. The method of claim 15, wherein the aqueous solution is applied at a temperature in the range of about 70° F. to about 170° F.

17. The method of claim 13, wherein the aqueous solution is applied at concentrations ranging from about 0.1% to the solubility limit of the aqueous solution.

18. The method of claim 12, further comprising:
heating the base fertilizer granules prior to application of the sulfuric acid.

19. The method of claim 18, wherein a target surface temperature of the base fertilizer granules when heating is from about 50° F. to about 250° F.

20. The method of claim 12, wherein a target moisture content of the fertilizer product is from about 0.5 wt % to about 6.5 wt %.

21. The method of claim 12, further comprising:
adding an additive to the surface of the fertilizer product, the additive being selected from the group consisting of: a secondary nutrient, a micronutrient a bio-stimulant, and combinations thereof.

22. The method of claim 21, wherein the additive is a secondary nutrient selected from the group consisting of: a source of sulfur, a source of calcium, a source of magnesium, and combinations thereof.

23. The method of claim 21, wherein the additive is a micronutrient selected from the group consisting of: a source of iron, a source of manganese, a source of zinc, a source of copper, a source of boron, a source of molybdenum, a source of chlorine, and combinations thereof.

24. The method of claim 12, wherein the liquid sulfuric acid is applied in an amount of about 0.1% to about 10 wt % of a total weight of the fertilizer product.

25. The method of claim 12, further comprising:
agitating the base fertilizer granules to induce mechanical interaction between the base fertilizer granules.

26. The method of claim 12, further comprising:
removing extra moisture from the fertilizer product with sulfuric acid thereon.

27. The method of claim 12, wherein the zinc is supplied by a zinc source selected from the group consisting of zinc sulfate heptahydrate, zinc sulfate monohydrate, zinc oxysulfate, zinc oxide, zinc chloride, zinc nitrate, ZnEDTA, and combinations thereof.

* * * * *